US009261148B2

(12) United States Patent
Hamasaki et al.

(10) Patent No.: US 9,261,148 B2
(45) Date of Patent: Feb. 16, 2016

(54) ELECTROMAGNETIC CLUTCH AND METHOD FOR PRODUCING ARMATURE FOR ELECTROMAGNETIC CLUTCH

(75) Inventors: Masafumi Hamasaki, Tokyo (JP); Masaki Kawasaki, Kiyosu (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 0 days.

(21) Appl. No.: 14/241,850

(22) PCT Filed: Mar. 28, 2012

(86) PCT No.: PCT/JP2012/002160
§ 371 (c)(1),
(2), (4) Date: May 30, 2014

(87) PCT Pub. No.: WO2013/076883
PCT Pub. Date: May 30, 2013

(65) Prior Publication Data
US 2014/0311852 A1  Oct. 23, 2014

(30) Foreign Application Priority Data

Nov. 24, 2011  (JP) .................................. 2011-255783

(51) Int. Cl.
*F16D 27/04* (2006.01)
*F16D 27/112* (2006.01)
*F16D 27/00* (2006.01)

(52) U.S. Cl.
CPC .............. *F16D 27/04* (2013.01); *F16D 27/112* (2013.01); *F16D 2027/008* (2013.01); *Y10T 29/4902* (2015.01)

(58) Field of Classification Search
None
See application file for complete search history.

(56) References Cited

U.S. PATENT DOCUMENTS

| 6,837,355 B2 | 1/2005 | Matsui et al. |
| 2003/0164277 A1 | 9/2003 | Matsui et al. |

(Continued)

FOREIGN PATENT DOCUMENTS

| JP | 9-32869 A | 2/1997 |
| JP | 11-141572 A | 5/1999 |

(Continued)

OTHER PUBLICATIONS

Japanese Office Action dated Aug. 19, 2014, issued in corresponding Japanese Patent Application No. 2013-545752, w/English translation (8 pages).

(Continued)

*Primary Examiner* — Rodney H Bonck
(74) *Attorney, Agent, or Firm* — Westerman, Hattori, Daniels & Adrian, LLP

(57) ABSTRACT

An electromagnetic clutch includes an armature 42 having a rotor contact surface 46a segmented in the radial direction by an annular groove 44 to form a plurality of rings, the groove being formed concentrically with the armature 42 for obstructing magnetic flux; and a rotor 43 having a contact surface, wherein the armature 42 is attracted toward the contact surface of the rotor 43 by magnetic force caused by an electromagnetic coil to couple the armature with the rotor for transmitting power. The armature 42 is formed by the steps of: preparing an armature material 42 with a groove 44 formed thereon, the groove having a width of w1; and narrowing the groove width from w1 to w2 by applying pressure on a pressed portion 47 in a peripheral edge region of the groove 44 to cause plastic flow in a horizontal direction along the material 42.

17 Claims, 20 Drawing Sheets

(56) References Cited

U.S. PATENT DOCUMENTS

2008/0236982 A1   10/2008  Zhao
2010/0258400 A1* 10/2010  Shirai et al. ................ 192/84.96

FOREIGN PATENT DOCUMENTS

| | | |
|---|---|---|
| JP | 2002-361345 A | 12/2002 |
| JP | 2003-254350 A | 9/2003 |
| JP | 2003-314584 A | 11/2003 |
| JP | 2008-249068 A | 10/2008 |
| JP | 2009-108927 A | 5/2009 |
| WO | 2011/142229 A1 | 11/2011 |

OTHER PUBLICATIONS

International Search Report dated Jun. 12, 2012 issued in corresponding application No. PCT/JP2012/002160.

Office Action dated Sep. 9, 2015, issued in counterpart Chinese Patent Application No. 201280048294A w/ English translation (14 pages).

English translation of Office Action dated Sep. 9, 2015, issued in counterpart Chinese Patent Application No. 201280048294.4 (7 pages).

\* cited by examiner

ELECTROMAGNETIC CLUTCH AND METHOD FOR PRODUCING ARMATURE FOR ELECTROMAGNETIC CLUTCH

TECHNICAL FIELD

The present invention relates to an improvement of an armature for an electromagnetic clutch applied to a motor vehicle air conditioner or the like for transmitting power.

BACKGROUND ART

Conventionally, a compressor used in a motor vehicle air conditioner includes an electromagnetic clutch provided between the air conditioner and a driving power source for transmitting power.

An electromagnetic clutch can be used to choose the transmission and non-transmission of power with an electromagnetic force, and, as shown in FIG. 19 for example, it is configured such that an armature 2 is attracted toward a rotor 3 by magnetic force caused by an electromagnetic coil 1 so as to couple the armature 2 with the rotor 3 for transmitting power (See Patent Literature 1, for example.). The exemplary configuration as shown in the drawing, the widths of the armature 2 and the rotor 3 in their radial direction are segmented into two and three, respectively, so that the contact surface (gap) 4 between them are segmented into four in the radial direction. Hereinafter, the contact surface 4 on the side of the rotor 3 is called an armature contact surface 4a and the contact surface 4 on the side of the armature 2 is called a rotor contact surface 4b.

As shown in FIG. 20A for example, the armature contact surface 4a of the rotor 3 is segmented into three in the radial direction by two grooves 5 having a groove width of a to form an inner ring 3a, an intermediate ring 3b, and an outer ring 3c. The two grooves 5 are circumferentially split at a plurality of portions by bridges 6 bridging the inner ring 3a, the intermediate ring 3b, and the outer ring 3c.

As shown in FIG. 20B for example, the contact surface of the armature 2 is also segmented into two in the radial direction by a groove 7 having a groove width of b to form an inner portion 2a and an outer portion 2b. The groove 7 on the side of the armature 2 is circumferentially split into several portions by bridges 8 bridging the inner portion 2a and the outer portion 2b. In this case, the armature 2 is manufactured from a plate-like material by punching.

As is well known in the art, the grooves 5 and 7 are formed to obstruct magnetic flux or magnetism, and called a magnetic gap.

CITATION LIST

Patent Literature

Patent Literature 1: Japanese Patent Laid-Open No. 2003-314554

SUMMARY OF INVENTION

Technical Problem

In the above described conventional electromagnetic clutch, when the armature 2 is not attracted toward the rotor 3 with a sufficient attractive force, the allowance of torque transmissibility decreases. That is, it has a problem that, when the allowance of torque transmissibility decreases because of an insufficient attractive force, slippage occurs between the armature 2 and the rotor 3.

To cope with this problem, it can be thought of increasing the contact area between the armature 2 and the rotor 3. This can be achieved by increasing the outer diameters of the armature 2 and the rotor 3. However, increasing those outer diameters is not preferable because it results in a large outer diameter of the electromagnetic clutch.

The present invention addresses the above problem with the object of providing a method for producing an armature for an electromagnetic clutch and providing an electromagnetic clutch where an attractive force between an armature and a rotor can be increased, without increasing the outer diameters of the armature and the rotor.

Solution to Problem

It is easily predictable that, other than increasing the outer diameters of the armature and the rotor, an increase in the contact area between the armature 2 and the rotor 3 may be achieved by narrowing the width of the groove 7 of the armature 2. Conventionally, the groove 7 is formed by punching. However, when the groove 7 has a narrow width, a punching die has less stiffness accordingly and becomes easily broken. Thus, given that it is mass-produced, there is a limit to narrowing the width of the groove. Though frequent replacement of the punching die would, of course, allow for the formation of a groove with a narrow width, it will result in an extremely high manufacturing cost of the armature.

The inventors have found that, when an armature material is thinned partially by applying pressure on the material, a narrow groove can be reasonably formed on a mass production basis while reducing loads acting on a punching die. The reduction of the thickness can be achieved in at least two modes.

In the first mode, an armature material is punched first to form a groove having a wide width which groove is to be a magnetic gap. Then, pressure is applied on the peripheral edge region of the groove to narrow the width of the groove. That is, plastic flow occurs at the peripheral edge region of the groove to narrow the width of the groove, increasing the contact area between the armature and the rotor accordingly. As a punching operation is used to form the wide groove and thus a punching die with higher stiffness can be used, the loads acting on the punching die can be reduced.

In the second mode, an armature material is thinned locally by applying pressure on a region where a groove is to be formed, thereby forming a thinned region in the armature material. Next, a punching operation is conducted to form a narrow groove which is to be a magnetic gap. As the region where the narrow groove is formed is thinned, less resisting forces act on a punching die. Thus, even when a punching die with a narrow width and thus having less stiffness is used, the loads acting on it can be reduced.

As described above, in the both modes, narrow grooves can be reasonably formed on a mass production basis.

Thus, an electromagnetic clutch that is achieved according to the present invention includes an armature having a rotor contact surface that is segmented in the radial direction by an annular groove to form a plurality of rings, the groove being formed concentrically with the armature for obstructing magnetic flux; and a rotor having a contact surface, wherein the armature is attracted toward the contact surface of the rotor by magnetic force caused by an electromagnetic coil so as to couple the armature with the rotor for transmitting power.

In this electromagnetic clutch, the armature is provided with a thin portion located at a peripheral edge region of the groove formed on the rotor contact surface, and wherein the thin portion has a thinner thickness than an outer peripheral portion of the armature adjacent to the peripheral edge region. In other words, the electromagnetic clutch includes a thin portion having a thickness that decreases toward the peripheral edge of the groove.

This armature is formed according to the above described first mode.

Another feature of the electromagnetic clutch according to the present invention is that the groove formed on the rotor contact surface is defined by a portion of the peripheral edge of the armature which portion is plastic flowed toward the center of the width of the groove.

A geometrical feature of the armature is that the pressed portion of the peripheral edge of the armature that is plastic flowed has a thinner thickness than a surrounding portion adjacent thereto.

An armature for an electromagnetic crutch according to the present invention can be produced in the two modes as described above. In either case, an armature material is thinned locally. That is, a method for producing an armature for an electromagnetic clutch according to the present invention is directed to a method for producing an armature for an electromagnetic clutch wherein the electromagnetic clutch includes the armature having a rotor contact surface that is segmented in the radial direction by an annular groove to form a plurality of rings, the groove being formed concentrically with the armature for obstructing magnetic flux; and a rotor having a contact surface, wherein the armature is attracted toward the contact surface of the rotor by magnetic force caused by an electromagnetic coil so as to couple the armature with the rotor for transmitting power; and wherein the armature is formed of an armature material in which a peripheral edge region of the formed groove is thinned.

In the above described first mode, the armature is formed by the steps of: preparing an armature material with a groove formed on the armature material, the groove having a width of w1; and narrowing the width of the groove from w1 to w2 by applying pressure on a pressed portion in a peripheral edge region of the groove of the armature material to cause plastic flow in a horizontal direction along the armature material.

According to the first mode, narrowing the width of the groove allows an increase in attractive force between the armature and the rotor, without increasing the outer diameters of the armature and the rotor. Moreover, since the step of preparing an armature material only requires a punching operation to form a groove with a width of w1 without causing insufficiency of stiffness of a punching die, an associated cost does not increase. The subsequent step of narrowing the width of the groove involving the application of pressure requires only a low cost. Thus, according to the present invention, a rise in production cost can be minimized.

In the step of narrowing the width of the groove according to the present invention, the pressure is applied by any type of pressing method. The pressure may be applied by pressing a pressing die on the armature supported by a supporting surface of a lower die, where the pressing die is provided with a pressing portion corresponding to the pressed portion. This method may be carried out by using a simple mechanism in which two opposing dies are coaxially moved closer to and away from each other. According to an alternative embodiment of the present invention, the pressure may be applied to the pressed portion of the armature supported by the lower die with the use of a roller-type tool.

In applying the pressure with the use of the pressing die and the lower die, the supporting surface of the lower die that supports the armature may be provided with a depression at a portion corresponding to the pressed portion of the armature. Alternatively, the supporting surface of the lower die that supports the armature, including a portion corresponding to the pressed portion of the armature, may be formed to be flat.

In the step of narrowing the width of the groove according to the present invention, the pressure is preferably applied by pressing a pressing die on the pressed portion while holding the armature between a holding die provided around the pressing die and the lower die. This effectively restricts plastic flow which occurs at the pressed portion so that the material of the pressed portion flows toward the center of the width of the groove.

When a holding die is used, one or both of the supporting surface of the lower die and an armature contact surface of the holding die are preferably subjected to friction intensifying treatment in order to make their effects remarkable. In this case, a portion corresponding to the pressed portion of the armature is excluded from the friction intensifying treatment. This is because the pressed portion with lower friction is easier to be modified by plastic flow. Thus, it is preferable that one or both of the pressing portion of the pressing die and a portion of the lower die corresponding to the pressed portion of the armature are subjected to friction reducing treatment.

According to the present invention, the pressing portion of the pressing die may be formed to have a curved shape or a flat shape at a portion for contacting the armature. For example, for a lower die provided with a depression, a pressing die with a pressing portion having a curved shape is preferable. For a lower die with an entirely flat support surface, a pressing die with a pressing portion having a flat shape is preferable.

In the above described second mode, the armature is formed by the steps of: thinning an armature material locally by applying pressure on a pressed portion where the groove to be formed, thereby forming a thin portion in the armature material; and punching the thin portion with a punching die to form the groove.

In the second mode, it is preferable that, in the step of thinning, the pressure is applied by pressing a pressing die on the armature material supported by a supporting surface of a lower die, the pressing die being provided with a pressing portion corresponding to the pressed portion, and furthermore, the lower die provided with a slit for receiving a portion of the armature material which is plastic flowed when the pressing die is pressed. This is for facilitating the thinning of the armature material.

In the second mode, the pressing die used in the step of thinning and the punching die used in the step of punching may be different dies. However, it is preferable that the pressing die has a divided structure in which a part of the pressing die serves as the punching die. In this case, changing a die used in the step of thinning to another die for the step of punching is not required, which reduces the processing time.

Advantageous Effects of Invention

According to the present invention, narrowing the width of the groove allows an increase in attractive force between the armature and the rotor, without increasing the outer diameters of the armature and the rotor. Moreover, since the step of preparing an armature material only requires a punching operation to form a groove without causing insufficiency of stiffness of a punching die, an associated cost does not increase. In addition, according to the above described first mode, as the subsequent step of narrowing the width of the groove involving the application of pressure requires only a low cost, a rise in production cost can be minimized. In the second mode, as the step of punching is a final process step, a groove is formed with high dimensional accuracy, without further processing.

BRIEF DESCRIPTION OF DRAWINGS

FIGS. 14A and 14B show the step of thinning, and FIGS. 14C and 14D show the step of punching.

FIGS. 16A and 16B show the step of thinning, and FIGS. 16C and 16D show the step of punching.

FIGS. 17A and 17B show the step of thinning, and FIGS. 17C and 17D show a case where a holding die is used in the step of punching as shown in FIGS. 16C and 16D.

FIGS. 18A and 18B show the step of thinning, and FIGS. 18C and 18D show a case where a ridge of an armature material is located opposite a lower die in the step of punching as shown in FIGS. 16C and 16D.

DESCRIPTION OF EMBODIMENTS

An embodiment of an electromagnetic clutch and a compressor equipped therewith according to the present invention are described below with reference to the accompanying drawings.

Figure 1:
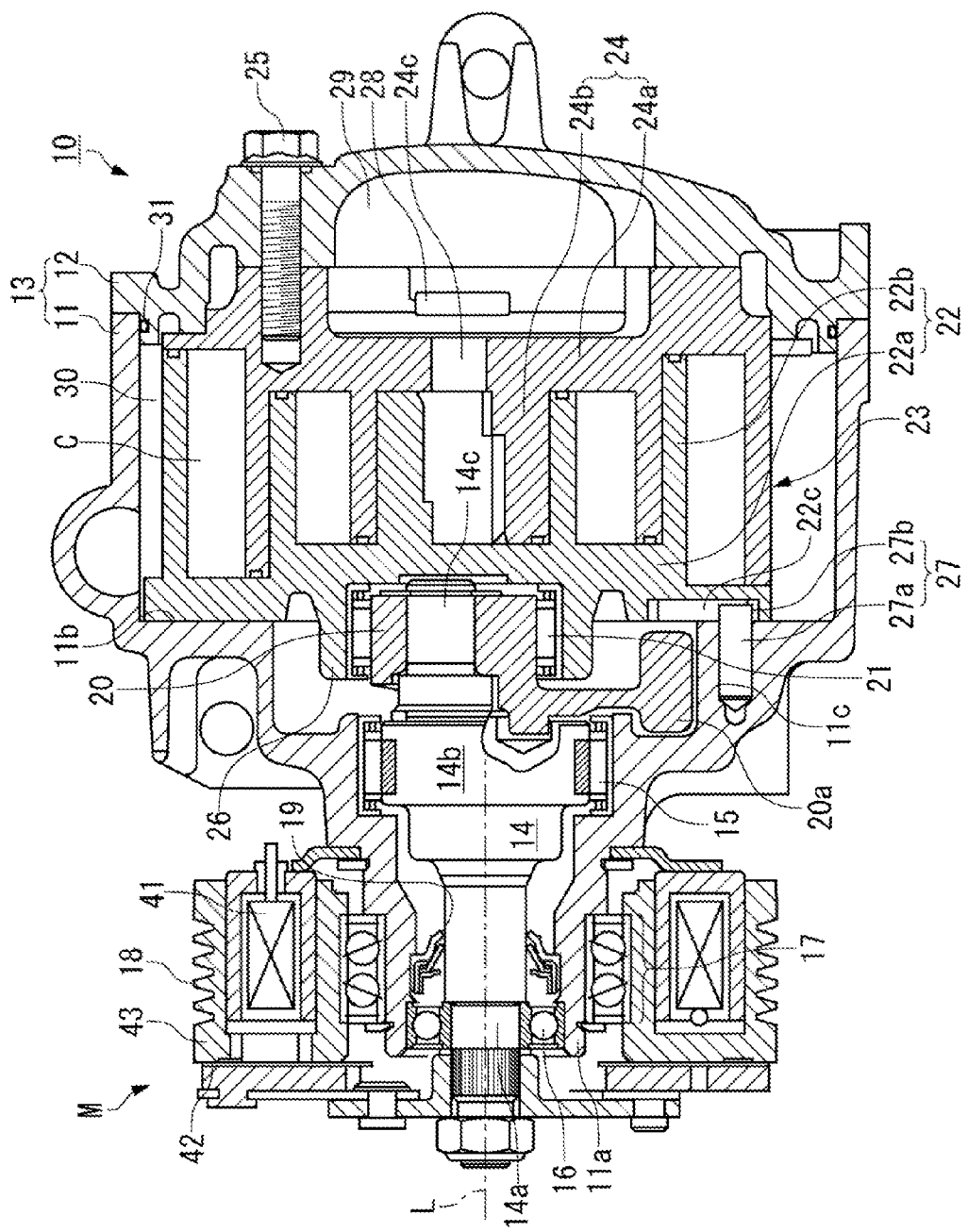
FIG. 1 is a longitudinal sectional view of an exemplary configuration of a scroll compressor provided with an electromagnetic clutch according to the present embodiment.

FIG. 1 is a longitudinal sectional view of an exemplary configuration of a scroll compressor provided with an electromagnetic clutch. The scroll compressor (compressor) 10 includes a housing 13 formed of a front housing 11 and a rear housing 12 which are fixed together with a tightened bolt (not shown).

Inside the front housing 11, a crankshaft (rotating shaft) 14 is rotatably supported about a rotational axis L via a main bearing (needle bearing) 15 and a sub-bearing (needle bearing) 16. One end portion (the left side in FIG. 1) of the crankshaft 14 is formed as a small diameter shaft portion 14a, which extends through the front housing 11 and protrudes outward. An electromagnetic clutch M is mounted on the protrusion of the small diameter shaft portion 14a for cutting off or transmitting power from a pulley 18 to the small diameter shaft portion. The pulley 18 is rotatably provided via a bearing 17 on the outer circumferential surface of a small diameter boss portion 11a at one end portion of the front housing 11. The pulley 18 receives power from an external driving power source (not shown) such as an engine via a V belt or the like.

A mechanical seal (lip seal) 19 is provided between the main bearing 15 and the sub-bearing 16 to hermetically seal the interior of the housing 13 against the atmosphere.

On the other hand, at the other end portion (the right side in FIG. 1) of the crankshaft 14, a large diameter shaft portion 14b is provided, and at the a large diameter shaft portion 14b, an offset pin 14c is integrally provided, which is offset at a predetermined distance from the rotational axis L of the crankshaft 14. The large diameter shaft portion 14b and the small diameter shaft portion 14a of the crankshaft 14 are rotatably supported by the front housing 11 via the main bearing 15 and the sub-bearing 16, respectively.

The offset pin 14c is connected to an orbiting scroll member 22 via a balance bush 20 and a drive bearing 21 so that the orbiting scroll member 22 is driven to orbit when the crankshaft 14 is rotated.

The balance bush 20 includes a balance weight 20a formed therein for eliminating load imbalance caused by the orbiting motion of the orbiting scroll member 22. The balance weight 20a orbits with the orbiting movement of the orbiting scroll member 22.

Inside the housing 13, a pair of members consisting of a fixed scroll member 24 and the orbiting scroll member 22 are incorporated to constitute a scroll compressor mechanism 23.

The fixed scroll member 24 include a fixed end plate 24a and a scroll wrap 24b formed to stand on the fixed end plate 24a, while the orbiting scroll member 22 includes an orbiting end plate 22a and a scroll wrap 22b formed to stand on the orbiting end plate 22a.

The fixed scroll member 24 and the orbiting scroll member 22 are arranged such that their respective centers are offset by a distance of an orbiting radius and that the scroll wraps 24b and 22b are engaged together at a phase shift of 180 degrees from each other. This arrangement forms a pair of compression chambers C between the both scroll members 24, 22 which chambers are defined (partitioned) by the end plates 24a, 22a and the scroll wraps 24b, 22b and are located symmetrically relative to the center of the scroll.

The fixed scroll member 24 is fixed to the inner surface (the bottom surface) of the rear housing 12 with a bolt 25. The orbiting scroll member 22 is provided with a boss portion 26 formed on the back surface of the orbiting end plate 22a, and is connected to the crankshaft 14 by the offset pin 14c that is provided at the other end portion of the crankshaft 14, and fitted into the boss portion 26 via the balance bush 20 and the drive bearing 21.

The orbiting scroll member 22 is supported at the back surface of the orbiting end plate 22a by a thrust receiving surface 11b formed on the front housing 11. The orbiting scroll member 22 is configured to be driven so as to revolve relative to the fixed scroll member 24 while being prevented from rotation by a rotation preventing pin-and-ring mechanism 27 that is interposed between the thrust receiving surface 11b and the back surface of the orbiting scroll member 22.

The rotation preventing pin-and-ring mechanism 27 includes pins 27a and rings 27b. One of the thrust receiving surface 11b and the back surface of the orbiting end plate 22a of the orbiting scroll member 22 is provided with pin holes 11c for mounting the pins 27a, while the other is provided with ring holes 22c into which the rings 27b are fitted. In the present embodiment, the thrust receiving surface 11b is provided with the pin holes 11c for receiving the pins 27a, while the orbiting scroll member 22 is provided with the ring holes 22c into which the rings 27b are fitted.

The pin holes 11c and the ring holes 22c are located at a plurality of portions, typically at three or four portions (four portions in the present embodiment), along the circumferential direction.

A discharge port 24c opens at the center of the fixed end plate 24a of the fixed scroll member 24 for discharging compressed refrigerant gas. The discharge port 24c is provided with a discharge reed valve (not shown) mounted to the fixed end plate 24a with a retainer 28.

A seal member (not shown) such as an O-ring is provided on the back surface of the fixed end plate 24a of the fixed scroll member 24 to closely contact the inner surface of the rear housing 12 so that the back surface of the fixed end plate 24a and the rear housing 12 define a discharge chamber 29 separated from the interior space (sealed space) of the housing 13. This allows the interior space of the housing 13 other than the discharge chamber 29 to function as an intake chamber 30.

The refrigerant gas having returned from a refrigerating cycle via an intake port (not shown) provided in the front housing 11 is drawn into the intake chamber 30 through which the refrigerant gas is drawn into the compression chambers C formed between the fixed scroll member 24 and the orbiting scroll member 22.

On a connection surface between the front housing 11 and the rear housing 12, provided is a seal member 31 such as an O-ring for hermetically sealing the intake chamber 30 formed in the housing 13 against the atmosphere.

The above described scroll compressor 10 includes an electromagnetic clutch N mounted on the crankshaft 14 of the compressor mechanism for transmitting power. The electromagnetic clutch M is configured such that an armature 42, which is a magnetic body, is attracted toward a contact surface of a rotor 43 by magnetic force caused by an electromagnetic coil 41 so as to couple the armature 42 with the rotor 43 for transmitting power.

Figure 2:
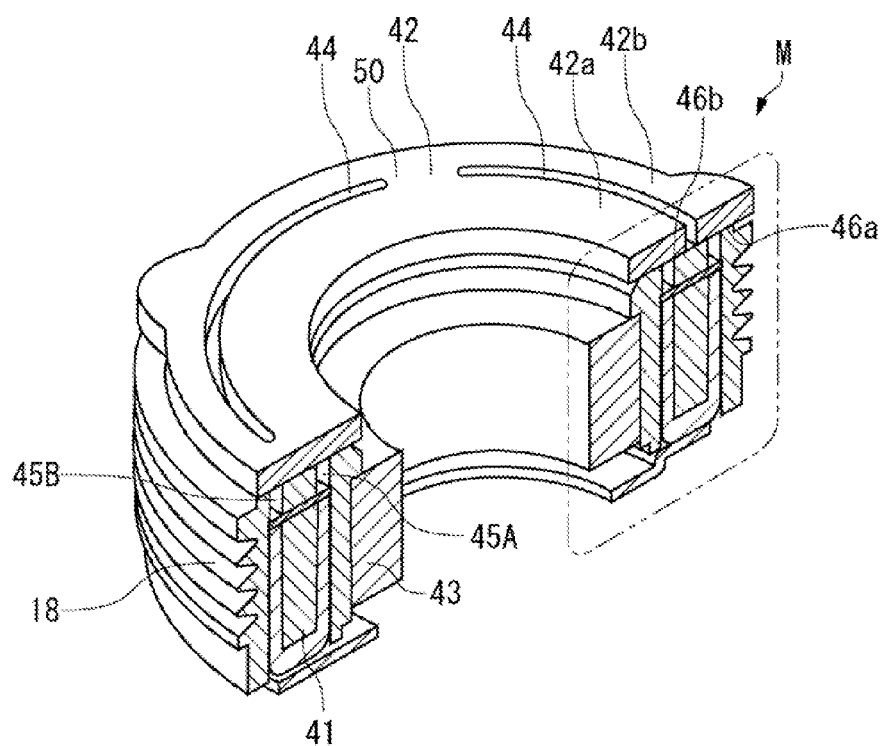
FIG. 2 is a partial cross-sectional perspective view of an electromagnetic clutch.
Figure 3A:
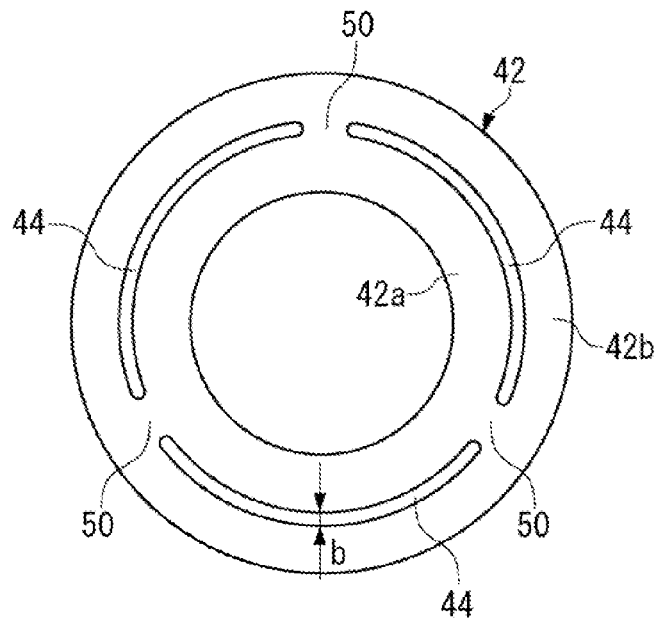
FIG. 3A is a plan view of an armature.

In the electromagnetic clutch M of the present embodiment shown in FIGS. 2 and 3A, for example, the armature 42 is segmented into two in the radial direction by a groove (intermediate groove) 44 having a width of b and extending through the armature 42 to form an inner ring 42a and an outer ring 42b. The groove 44 is circumferentially split at a plurality of portions by bridges 50 bridging the inner ring 42a and the outer ring 42b. The groove 44 split by the bridges 50 forms arcs each having the same width of b.

Figure 3B:
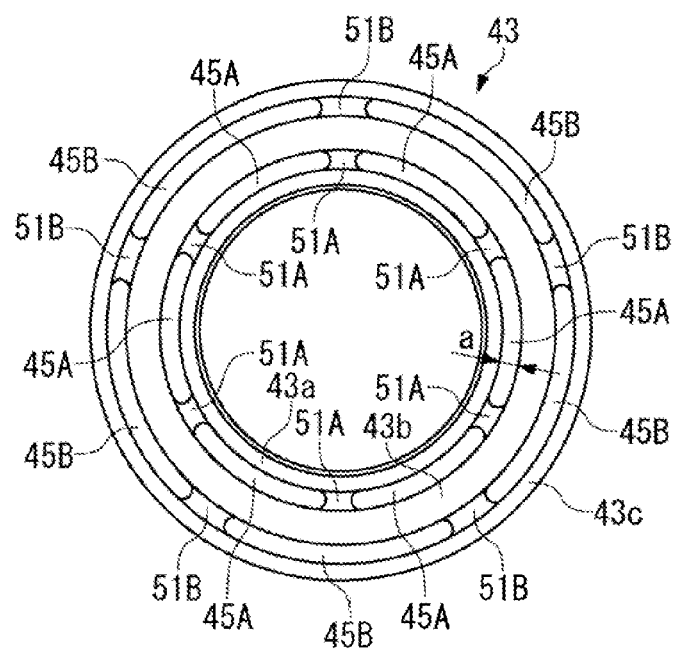
FIG. 3B is a plan view of a rotor.

In the electromagnetic clutch M of the present embodiment, as shown in FIGS. 2 and 3B, for example, the rotor 43 is segmented into three in the radial direction by two grooves 45A (inner groove) and 45B (outer groove) having a width of a to form an inner ring 43a, an intermediate ring 43b, and an outer ring 43c. The two grooves 45A, 45B are circumferentially split at a plurality of portions by bridges 51A, 51B bridging the inner ring 43a, the intermediate ring 43b, and the outer ring 43c. The grooves 45A, 45B split by the bridges 51A, 51B form arcs each having the same width of a.

As the grooves 44, 45A, 45B are so formed, a rotor contact surface 46a of the armature 42 and an armature contact surface 46b of the rotor 43 cause attractive forces between them at a first contact surface A1 where the inner ring 43a of the rotor 43 is in opposing relation to the inner ring 42a of the armature 42, at a second contact surface A2 where the inner ring 42a of the armature 42 is in opposing relation to the intermediate ring 43b of the rotor 43, at a third contact surface A3 where the outer ring 42b of the armature 42 is in opposing relation to the intermediate ring 43b of the rotor 43, and at a fourth contact surface A4 where the outer ring 43c of the rotor 43 is in opposing relation to the outer ring 42b of the armature 42, all the contact surfaces A1 to A4 being annular.

The grooves 44, 45A, and 45B are preferably formed such that all the annular contact regions have the same surface area whereby almost the same attractive force occurs, respectively, at the first contact surface A1, the second contact surface A2, the third contact surface A3, and the fourth contact surface A4. Alternatively, the outermost fourth contact surface A4 may be formed to have the largest area among the first, second, third, and fourth contact surfaces A1, A2, A3, and A4 so as to increase the opposite force against the rotating torque when the armature 42 and the rotor 43 are attracted to each other.

Figure 4:
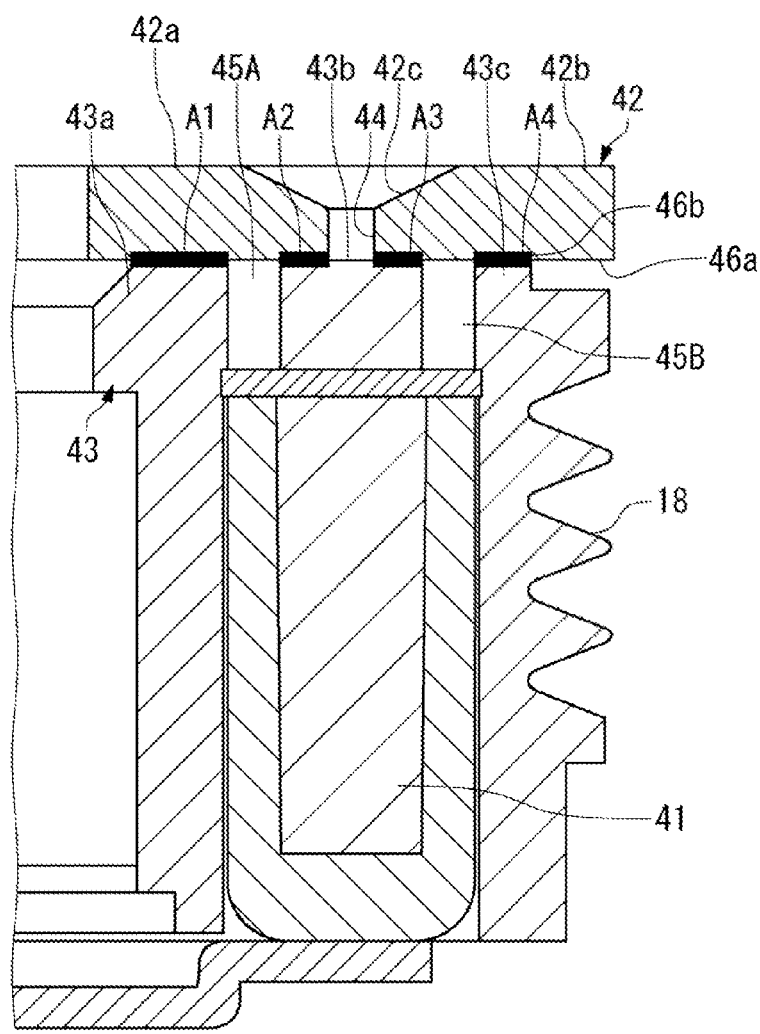
FIG. 4 is an enlarged sectional view of portions of the armature and the rotor that are in tight contact with each other by pressure.

In the present embodiment, as shown in FIG. 4, the armature 42 includes a depression 42c with tapered sides extending along the peripheral edge of the groove 44 formed on the top surface of the armature shown in FIG. 4. The thinned depression 42c is formed by causing plastic flow (or plastic deformation) of the portion along the peripheral edge of the groove 44 toward the center of the width of the groove 44. The width of the groove 44 becomes narrowed compared to before the plastic flow is caused.

First Embodiment

A process of narrowing the groove 44 according to a first embodiment is described below with reference to FIGS. 5 and 6.

As shown in FIGS. 5 and 6, the pressing die 60 and the lower die 70 are prepared in order to narrow the width of the groove 44.

Figure 6A:
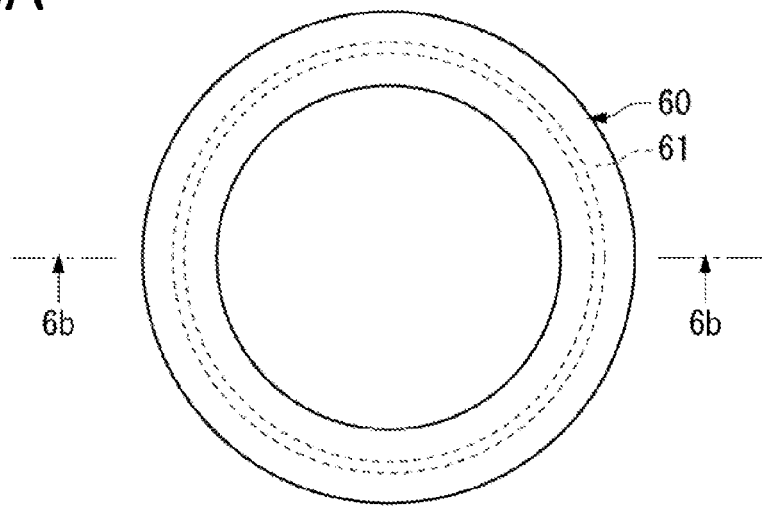
FIG. 6A is a plan view illustrating a pressing die used for narrowing the groove of the armature in accordance with the first embodiment.
Figure 6B:
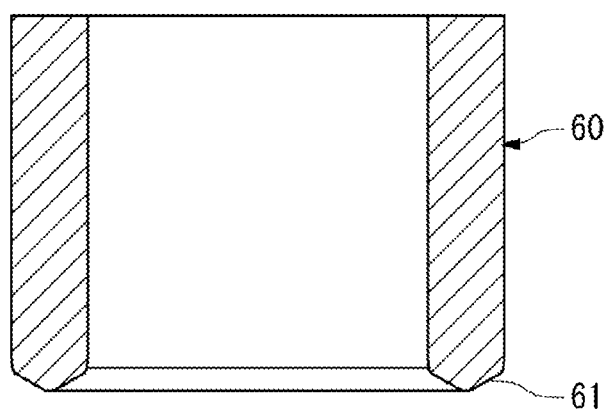
FIG. 6B is a sectional view of the pressing die of FIG. 6A as viewed on the arrow 6b-6b.

As shown in FIGS. 6A and 6B, the pressing die 60 has a hollow cylindrical shape, and is provided with a pressing portion 61 at one end portion of the pressing die 60 in the axial direction. The pressing portion 61 is V-shaped with the top located at the center of the pressing portion 61 in the radial direction.

The lower die 70 is ring-shaped and has a supporting surface 71 with a depression 72 formed thereon. The depression 72 is formed along the peripheral of the die and has a V-shaped cross section with the top located at the center of the width.

Figure 5A:
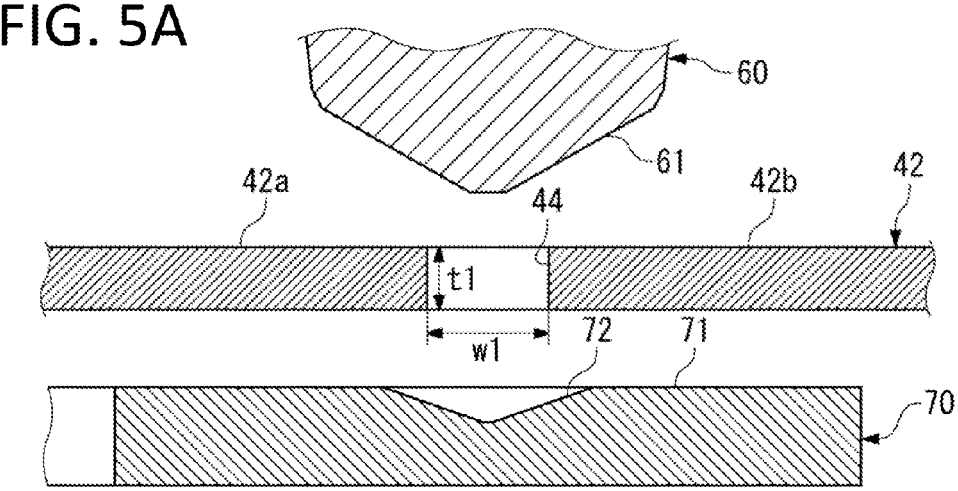
FIGS. 5A to 5C are enlarged partial sectional views illustrating a procedure for narrowing a groove of the armature in accordance with a first embodiment.

As shown in FIG. 5A, a pressing die 60 and a lower die 70 are disposed so that the top of a protrusion is aligned to the bottom of a depression at the center of the width of the groove 44 formed on the armature 42 (armature material), in order to subject the armature 42 to a process of narrowing the groove 44. Though FIG. 5A shows the armature 42 is disposed away from the lower die 70 to facilitate better understanding, the armature 42 is placed on the lower die 70 before performing the process of narrowing.

The pressing die 60 and the lower die 70 are made of steel for cold working die, typically, JIS SKD 11 steel, or a material having strength and abrasion resistance that are equal to or higher than that of steel for cold working die. These materials have higher hardness and strength than a magnetic material constituting the armature 42.

The groove 44 of the armature 42 (armature material) has a width of w1 and a thickness of t1 before it is subjected to the process of narrowing. The groove 44 is formed by punching a material for the armature 42. For industrial-scale production, the limit of the width of the groove 44 that can be formed by punching is about 2 mm as described above. In the present embodiment, the groove 44 with a width of w1 formed by punching is narrowed by a process of narrowing with the use of the pressing die 60 and the lower die 70.

Figure 5B:
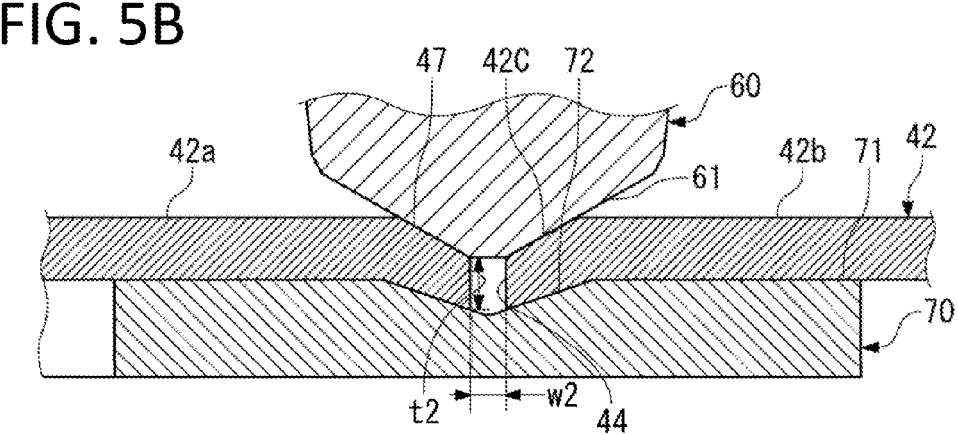

To conduct the process, the pressing die 60 is lowered against the armature 42 supported by the lower die 70 (FIG. 5B). After a pressing portion 61 of the pressing die 60 comes in contact with the surface of the armature 42, the pressing die 60 is further lowered to cause a pressed portion 47, which is located at the peripheral edge of the groove 44 and comes in contact with the pressing portion 61, to be pressed between the pressing die 60 and the lower die 70 so that the thickness of the pressed portion 47 becomes thinner from t1 to t2. As the pressed portion 47 is thinned, it is deformed to extend toward the center of the width of the groove 44 accordingly. Such plastic flow of the pressed Portion 47 narrows the width of the groove 44 so that the plastic flowed pressed portion 47, i.e., the peripheral edge portion of the armature 42, defines the groove having a width of w2 that is about 0.5 to 1.5 mm.

Figure 5C:
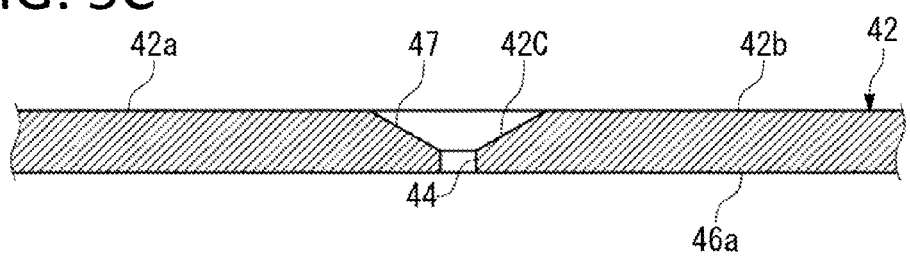

The armature 42 subjected to the narrowing process becomes deformed to conform to the shapes of the pressing portion 61 of the pressing die 60 and the depression 72 of the lower die 70 so that a protrusion is formed on the side of the rotor contact surface 46 of the pressed portion 47. As the protrusion so formed can interfere with the armature contact surface 46b of the rotor 43, the protrusion is removed, for example, by cutting such that the cut portion is flattened to flush with the rotor contact surface 46a, as shown in FIG. 5C. The removal of the protrusion may be conducted by a machining process such as polishing and press working other than cutting. The surface that has been subjected to the narrowing process may also be flattened by a machining process for removing the depression of the pressed portion 47. That is, according to the present invention, after the narrowing process, one or both of the front surface on which the pressed portion 47 lies and the back surface opposite the front surface may be flattened by machining.

As described above, according to the present embodiment, after a punching process is performed to form the groove 44 with a reasonable width, the width of the groove 44 is narrowed by causing plastic flow of the peripheral edge of the groove 44. As the narrowing process is conducted by applying pressure on the material with the pressing die 60 and the lower die 70, these dies have longer life than a punching die. Thus, according to the present embodiment, provided is the electromagnetic clutch M in which an attractive force between the armature 42 and the rotor 43 is raised by increasing the contact area between them, without increasing the outer diameters of the armature 42 and the rotor 43, while minimizing a rise in production cost.

Second Embodiment

Figure 7A:
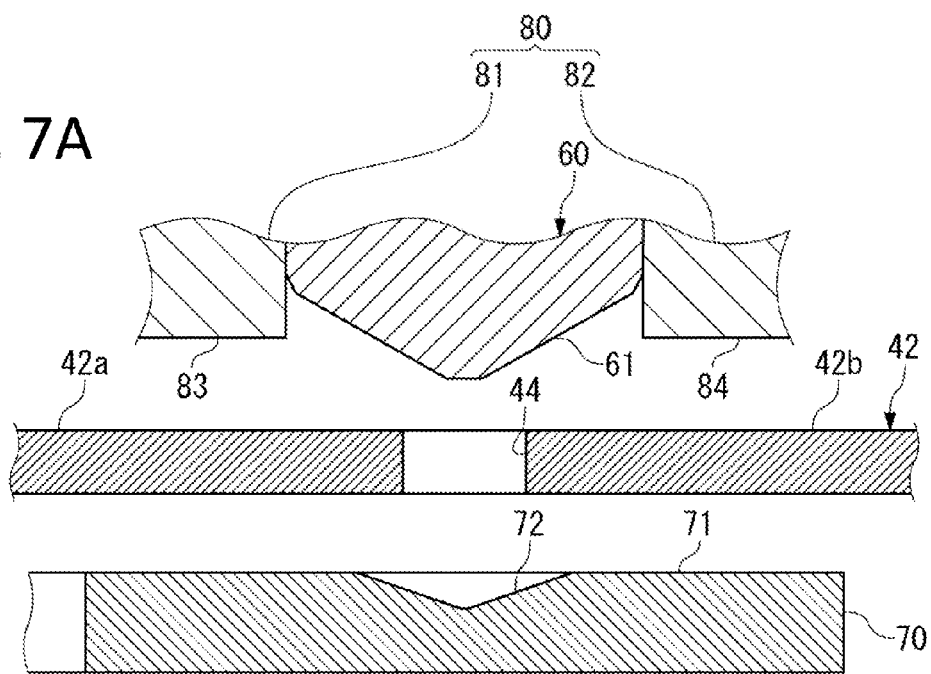
FIGS. 7A and 7B are enlarged partial sectional views illustrating a procedure for narrowing a groove of the armature in accordance with a second embodiment.
Figure 7B:
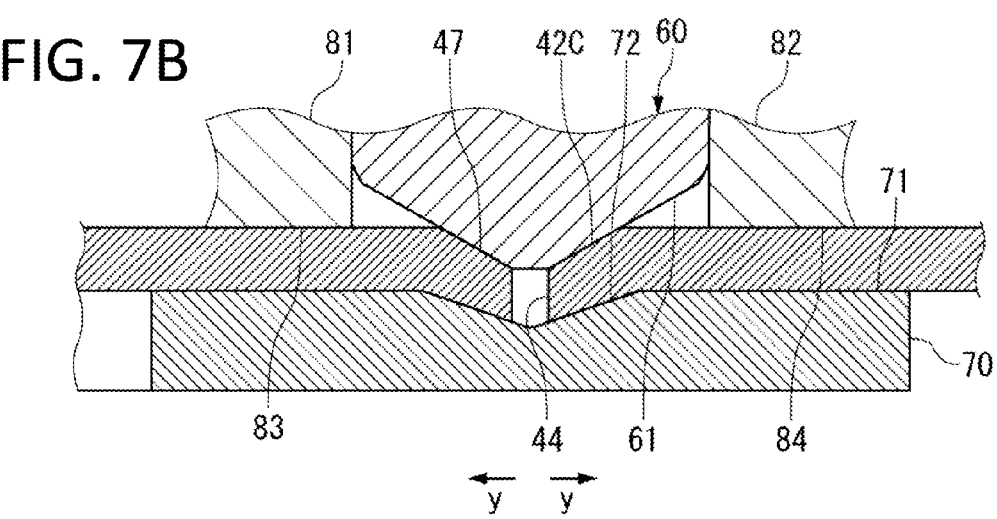
Figure 8A:
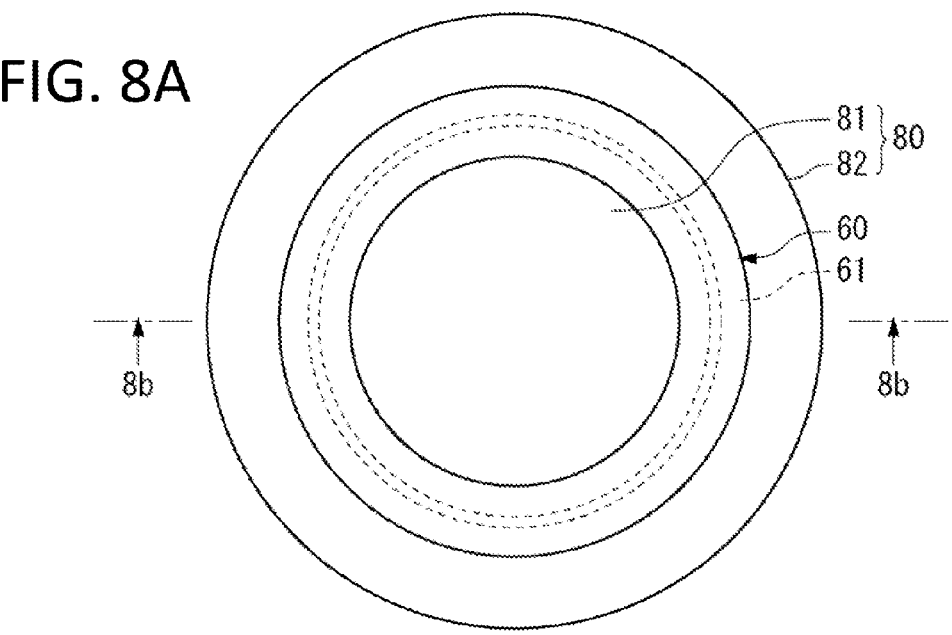
FIG. 8A is a plan view illustrating a pressing die used for narrowing the groove of the armature in accordance with the second embodiment.
Figure 8B:
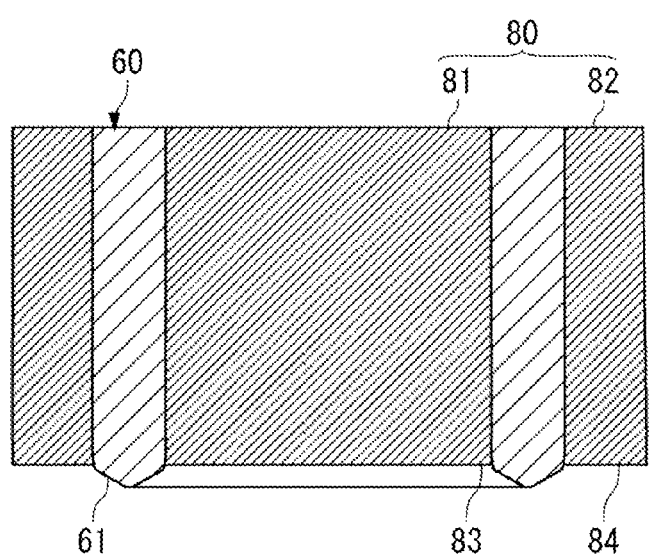
FIG. 8B is a sectional view of the pressing die of FIG. 8A as viewed on the arrow 8b-8b.

A process of narrowing according to a second embodiment is described with reference to FIGS. 7 and 8. The same component portions as the first embodiment are identified by the same reference numerals in FIGS. 7 and 8 as in FIGS. 5 and 6, and will not be further described.

In the second embodiment, a holding die 80 is used in addition to the pressing die 60 and the lower die 70. The holding die 80 includes a cylindrically shaped inner cylinder part 81 and a hollow cylindrically shaped outer cylinder part 82, and the inner cylinder part 81 is concentrically disposed within the outer cylinder part 82. The pressing die 60 is disposed between the inner cylinder part 81 and the outer cylinder part 82 such that the pressing die is slidable relative to the inner and outer cylinder parts 81, 82 in the axial direction. That is, the pressing die 60 and the holding die 80 can be raised and lowered independently. The outer diameter of the inner cylinder part 81 and the inner diameter of the pressing die 60 as well as the inner diameter of the outer cylinder part 82 and the outer diameter of the pressing die 60 are determined so as to allow for the sliding movement of the elements. The holding die 80 may be formed of the same material as the pressing die 60 and the lower die 70.

In the second embodiment, after the armature 42 is placed at a predetermined position on the lower die 70, only the holding die 80 is lowered while the pressing die 60 is kept away from the armature 42, causing the armature 42 to be sandwiched between the holding die 80 and the lower die 70. This causes the armature 42 to be mechanically held in position.

Next, while the armature 42 being held between the holding die 80 and the lower die 70, the pressing die 60 is lowered to thin the peripheral edge of the groove 44 of the armature 42, thereby narrowing the width of the groove 44. The effect of the narrowing process is the same as that in the first embodiment.

The second embodiment is different from the first embodiment in that the armature 42 is held in position as described above. Thus, in the narrowing process, the armature 42 exhibits the following behavior.

In the narrowing process, when the pressing die 60 presses the armature 42, forces are applied to the pressed portion 47 and its peripheral edge portion in the outward directions from the groove 44 as indicated by arrows y, causing the pressed portion 47 and its peripheral edge portion to deform in the outward directions (indicated by arrows y). This deformation partially offsets the narrowing of the groove 44 achieved by plastic flow of the material. Thus, in the second embodiment, the holding die 80 and the lower die 70 are used to hold the armature 42 mechanically in the horizontal direction so as to prevent the deformation. As such, according to the second embodiment, the plastic flow occurring in the narrowing process is restricted to the direction toward the center of the groove 44 as much as possible, which ensures that the groove 44 is properly narrowed.

In the second embodiment, the following points are preferably taken into account in order to achieve its object.

(1) Using Holding Die 80 and Lower Die 70 to Increase Holding Force on Armature 42

When the holding die 80 (the inner cylinder part 81 and the outer cylinder part 82) includes pressing surfaces 83, 84 which are to contact the armature 42 and the lower die 70 includes a supporting surface 71 which is to contact the armature 42, the surface roughness of the pressing surfaces 83, 84 is increased, or that of the supporting surface 71 is increased. As described earlier, the holding die 80 and the lower die 70 generally have higher hardness than the armature 42. Thus, when the surfaces with asperities produced by the increased surface roughness, contact the armature 42, a friction force generated between the surfaces and the armature 42 becomes larger, thereby increasing a holding force used in the narrowing process. Of course, both the surface roughness of the pressing surfaces 83, 84 and that of the supporting surface 71 may be increased. Using the armature 42 with the increased surface roughness is expected to achieve a similar effect to the above.

Means for increasing the holding force is not limited to the increased surface roughness. For example, when at least one of the pressing surfaces 83, 84 and the supporting surface 71 is provided with a small protrusion, the protrusion bites into the armature 42, which is expected to achieve a similar effect to the increased surface roughness.

(2) Friction Force Generated at Portions Corresponding to Pressed Portion 47

In the narrowing process, when the forces applied to the pressed portion 47 of the armature 42 in the outward directions as indicated by arrows y are large, a buckling is likely to occur at the peripheral edge of the groove 44, preventing the plastic flow of the pressed portion. In order to avoid this, the holding force is preferably increased in the horizontal direction, thereby making the pressed portion 47 be easily deformed in the downward direction. Thus, it is encouraged to increase the coefficient of friction of the surface of the pressing portion 61 of the pressing die 60 against the armature 42. Applicable means for increasing the coefficient of friction include increasing the surface roughness of the surface of the pressing portion 61, and coating the pressing portion with a material with a high coefficient of friction.

On the other hand, decreasing the coefficient of friction of the surface of the depression 72 of the lower die 70 allows the pressed portion 47 easily become deformed in the depression 72, thereby achieving the desired plastic flow. Thus, applicable means for decreasing the coefficient of friction include decreasing the surface roughness of the portion, applying a lubricant to the portion, and coating the portion with a material with a low coefficient of friction such as fluoroplastics.

As such, in the second embodiment, it is preferable that the coefficient of friction of the surface of the depression 72 is lowered relative to that of the surface of the pressing portion 61.

Modifications to Elements

In the above described first (second) embodiment, modifications may be made to elements thereof as explained below.

(1) Shape of Supporting Surface 71 of Lower Die 70

Figure 9A:
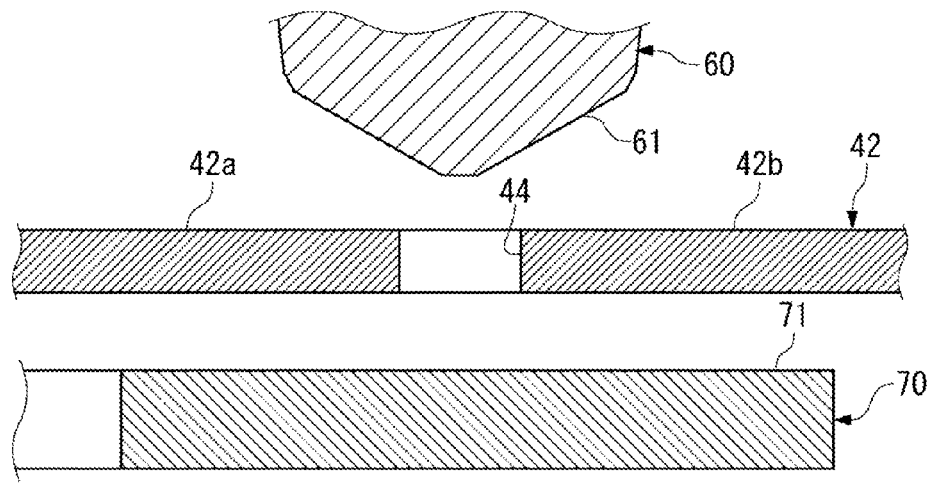
FIGS. 9A and 9B are enlarged partial sectional views illustrating a procedure for narrowing a groove of the armature in accordance with a variation of the first or second embodiment.
Figure 9B:
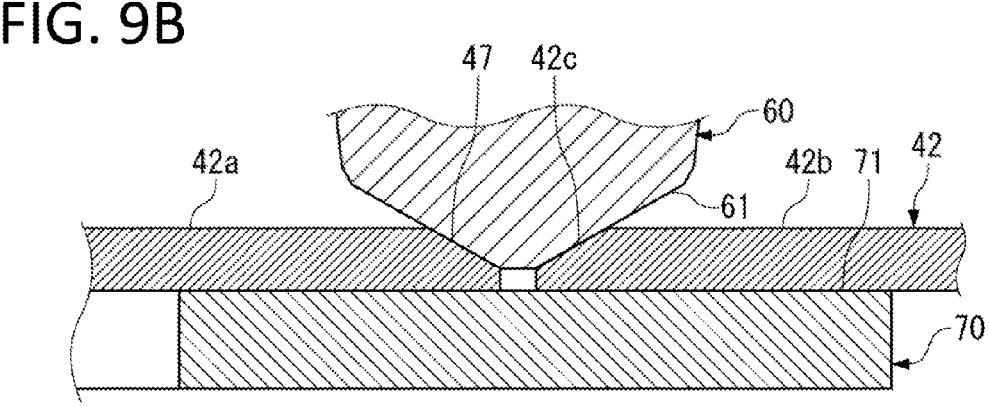

Though the lower die 70 of the above embodiment includes the depression 72 formed on the supporting surface 71, the depression is not essential in the present invention. That is, as shown in FIGS. 9A and 9B, the entire supporting surface 71 of the lower die 70 can be a flat surface.

This enables the elimination of the protrusion removal step which, in the above embodiment, is necessary after the narrowing process. This also advantageously decreases the components of pressure acting on the armature 42 in the horizontal directions, especially, in the outward directions (y directions in the drawing), causing plastic flow primarily in the inward directions.

(2) Pressing Portion 61 of Pressing Die 60

Figure 10A:
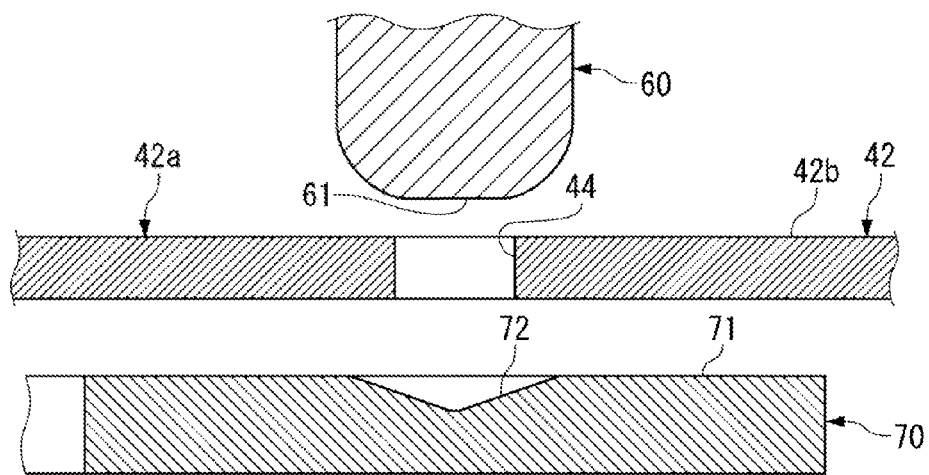
FIGS. 10A and 10B are enlarged partial sectional views illustrating a procedure for narrowing a groove of the armature in accordance with another variation of the first or second embodiment.
Figure 10B:
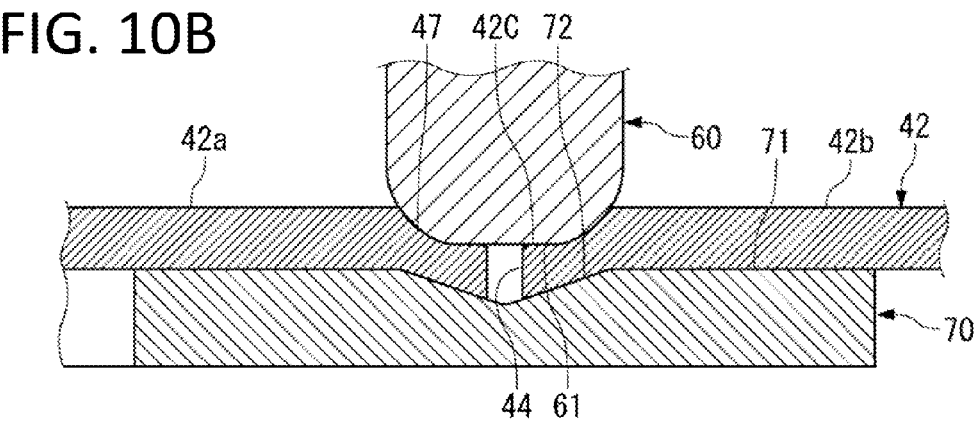

Though the pressing portion 61 of the above embodiment has a downwardly protruding shape, the pressing portion 61 may be formed to have a flat shape, as shown in FIGS. 10A and 10B.

Like the entirely flat supporting surface 71 of the lower die 70, the flat pressing portion 61 decreases components of pressure acting on the armature 42 in the horizontal directions, especially, in the outward directions, causing plastic flow primarily in the inward directions.

(3) Restriction of Flow (Deformation) of Pressed Portion 47

Figure 11A:
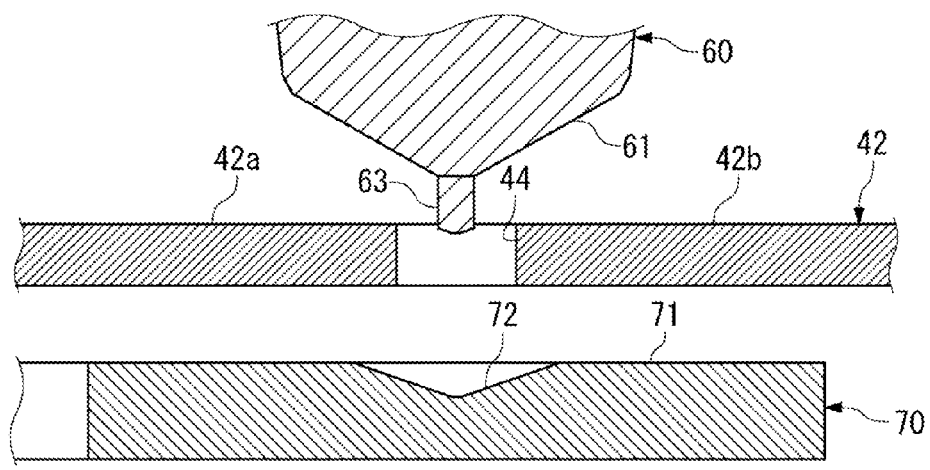
FIGS. 11A and 11B are enlarged partial sectional views illustrating a procedure for narrowing a groove of the armature in accordance with yet another variation of the first or second embodiment.
Figure 11B:
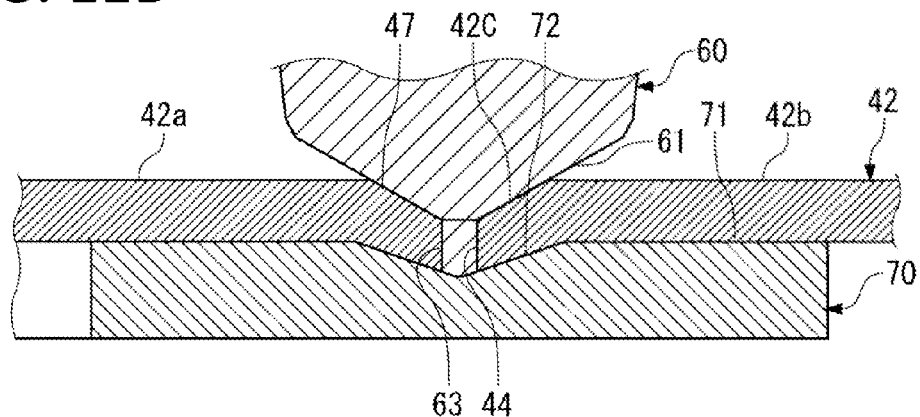

In the present embodiment, plastic flow that occurs in the pressed portion 47 results in the groove 44 with a narrowed width. However, it is desirable to avoid indiscriminately narrowing the width of the groove. For this reason, as shown in FIGS. 11A and 11B, a deformation restricting member 63 may be provided to protrude from the top of the pressing portion 61. The deformation restricting member 63 is formed to have an arcuate shape extending along the top of the pressing portion 61 except for the portions corresponding to the bridges 50.

As shown in FIG. 11B, the deformation restricting member 63 is inserted into the groove 44 of the armature 42 for restricting the inward horizontal deformation of the pressed portion 47 in the narrowing process.

Though the deformation restricting member 63 is provided on the pressing die 60 in this embodiment, the deformation restricting member may be provided on the lower die 70 as described later, or the deformation restricting member may be a separate member from the pressing die 60 and the lower die 70.

(4) Divided Structure of Lower Die 70

Figure 12A:
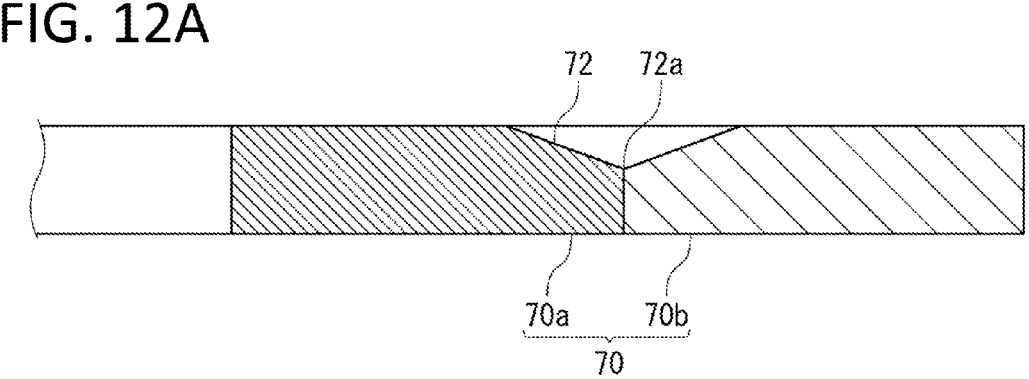
FIGS. 12A and 12B are enlarged partial sectional views illustrating a lower die in according with a variation of the first or second embodiment.

In the lower die 70, stress is concentrated particularly on a bottom 72a of the depression 72 in the narrowing process. Thus, as shown in FIG. 12A, the lower die may be divided at the bottom 72a of the depression 72 in the radial direction into an inner die 70a and an outer die 70b that are located on the inner and outer sides, respectively, of the location of the division, thereby allowing for avoidance of cracking caused due to stress concentration.

Figure 12B:
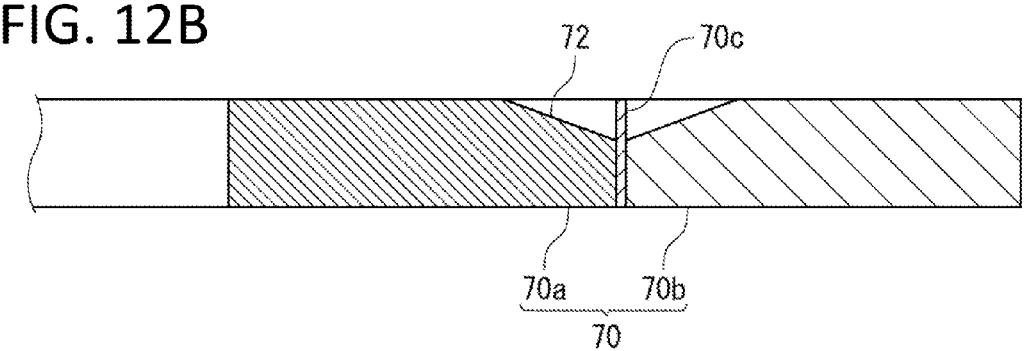

In this case, as shown in FIG. 12B, a ring-shaped deformation restricting member 70c which serves as the same function as the deformation restricting member 63 described in (3) may be provided between the inner die 70a and the outer die 70b. Since only a deformation restricting member 70c can be replaced when it is damaged, the use of the member contributes to a reduction in costs compared to cases where the whole lower die 70 is replaced.

(5) Upper and Lower Dies with Protruding Structure

Figure 13A:
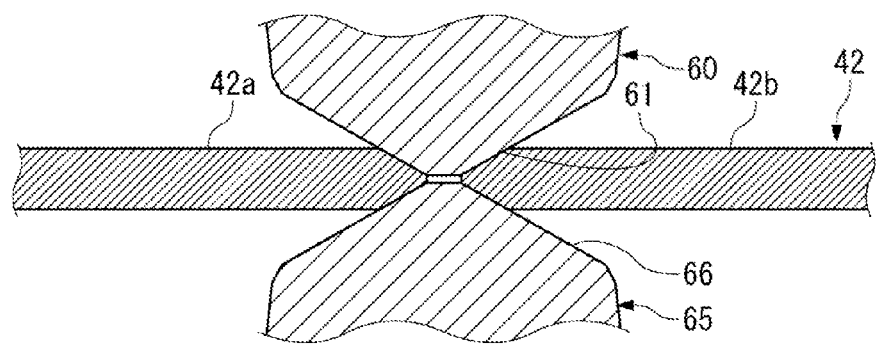
FIGS. 13A and 13C are enlarged partial sectional views illustrating another lower die in accordance with another variation of the first or second embodiment.

As shown in FIG. 13A, a lower die 65 with a pressing portion 66 having a protruding shape in the same manner as the pressing die 60, which is an upper die, may be used.

Figure 13B:
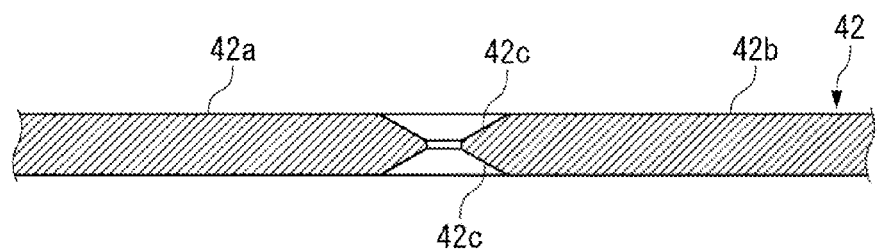
Figure 13C:
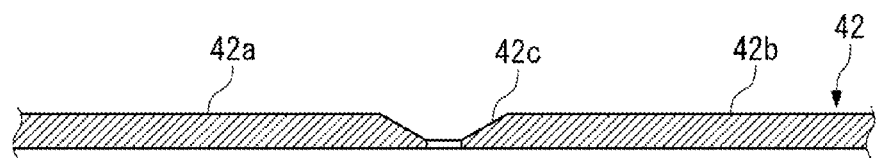

In cases where both the upper and lower die have pressing portions 61, 66 with a protruding shape, the narrowed depressions 42c are formed on both the opposing surfaces of the armature 42 as shown in FIG. 13B. Thus, as shown in FIG. 13C, either of the surfaces is flattened by polishing or the like to remove the depression 42c.

Third Embodiment

In the above embodiments, a grooved armature material is used and the peripheral edge of the groove is pressed to form a narrowed groove. However, an armature with a narrowed groove can be formed through techniques different from this according to the present invention. The essence of a third embodiment is that, after thinning a region of an armature material 42r where a groove is to be formed and its peripheral edge region, a punching die is used to form the groove. Hereinafter, the third embodiment is described with reference to FIGS. 14 and 15. The same component portions as the first embodiment are identified by the same reference numerals, and will not be further described.

Figure 14A:
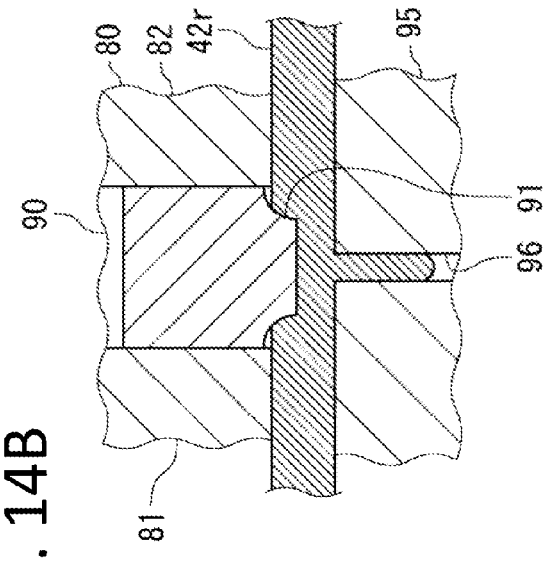
FIGS. 14A to 14D illustrate a procedure for producing an armature in accordance with a third embodiment.
Figure 14B:
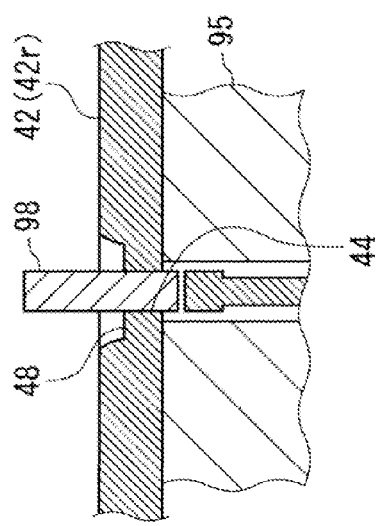
Figure 14C:
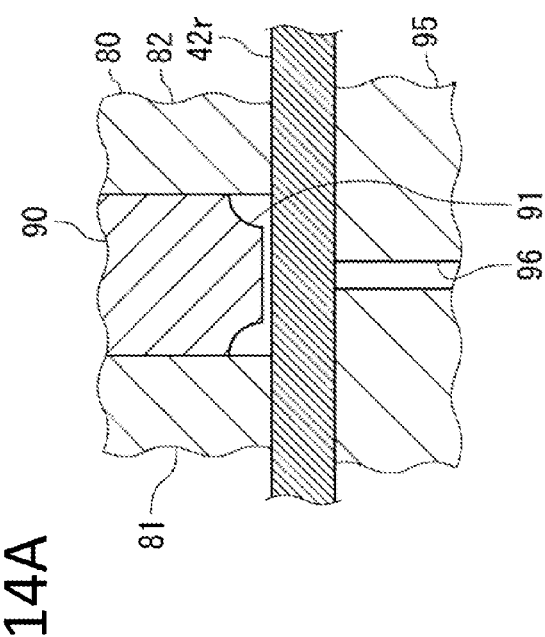
Figure 14D:
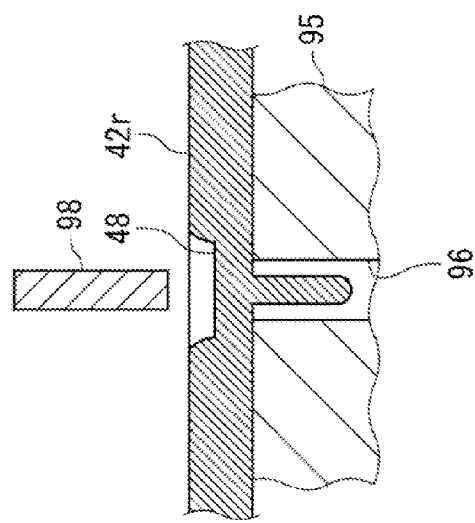

The third embodiment involves the steps of thinning the armature material 42r (FIGS. 14A and 14B), and punching the thin portion (FIGS. 14C and 14D).

The step of thinning is performed with a pressing die 90, a lower die 95, and a holding die 80.

The pressing die 90 has a hollow cylindrical shape, and is provided with a pressing portion 91 at one end portion of the pressing die 90 in the axial direction. The pressing portion 91 has a shape the top portion of which is formed by the central portion of the pressing portion 91 excluding an outer circumferential edge and an inner circumferential edge.

The lower die 95 includes a slit 96 extending in the thickness direction of the lower die 95 in place of the depression 72 of the lower die 70 in the first embodiment. The slit 96 is formed along the circumferential direction of the lower die 95.

The pressing die 90 and the lower die 95 are relatively positioned such that the center of the width of the pressing portion 91 is aligned with the center of the width of the slit 96.

The holding die 80 includes an inner cylinder part 81 and an outer cylinder part 82 in the same manner as the second embodiment.

In the third embodiment, while the armature material 42r being mechanically held between the holding die 90 and the lower die 95, the pressing die 90 is lowered to locally thin the armature material 42r (FIGS. 13A and 13B). While a portion in the armature material 42r which portion the pressing die 90 faces is thinned, a portion of the armature material 42r which portion the lower die 95 faces is deformed by plastic flow into the slit 96.

After the thinning operation is performed as required, the pressing die 90 and the holding die 80 are removed and the width of the slit 96 of the lower die 95 is widened. Then, after a punching die 98 is positioned opposite to the thin portion 48 of the armature material 42r, the punching die 98 is lowered to form a groove 44 (FIGS. 14C and 14D). The resulting armature 42 is provided with a thin portion 48 around the groove 44 that is formed in the thinning step. The thin portion 48 has a thickness that continuously increases in both directions along the width direction.

In the third embodiment, a region where the groove 44 is to be formed is thinned to decrease resisting forces which occur in a punching operation, thereby improving workability of the material in forming the narrowed groove 44.

Additionally, in the third embodiment, as the step of punching is a final process step, the groove 44 is formed with high dimensional accuracy, without further processing.

In the third embodiment, the thin portion 48 is formed to have a flat bottom. However, this is merely a preferred embodiment, and the bottom part of the thin portion 48 may have a thickness that continuously changes as the peripheral part thereof. Considering that the thin portion 48 is made to achieve high workability, a flat bottom as shown in the drawings is preferable. The thin portion 48 has a larger surface area than the area of the opening of the groove 44.

In the above explained example, the pressing die 90 and the punching die 98 are prepared as separate members. An upper die 100 which serves both functions of the pressing die 90 and the punching die 98 may be used as described below.

Figure 15A:
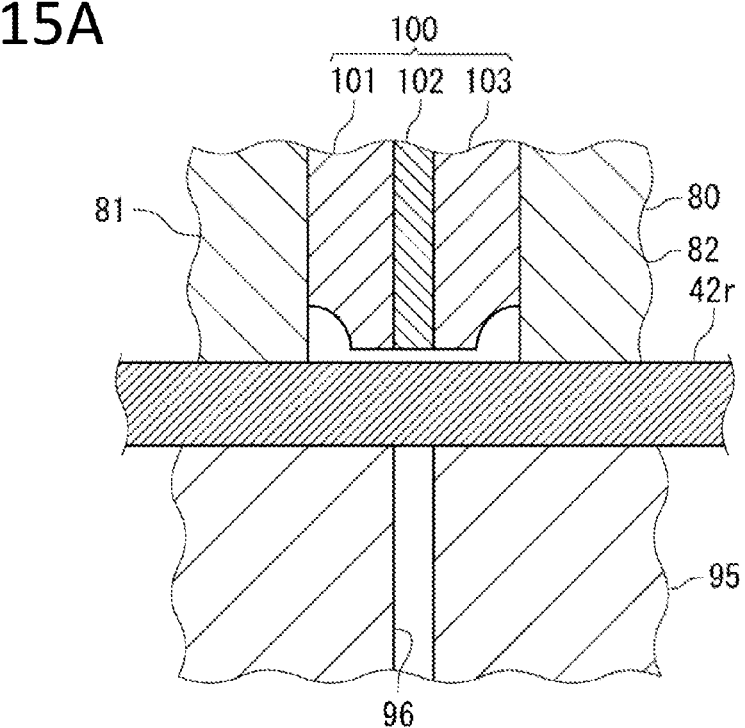
FIGS. 15A and 15B are enlarged partial sectional views illustrating a variation of the third embodiment.
Figure 15B:
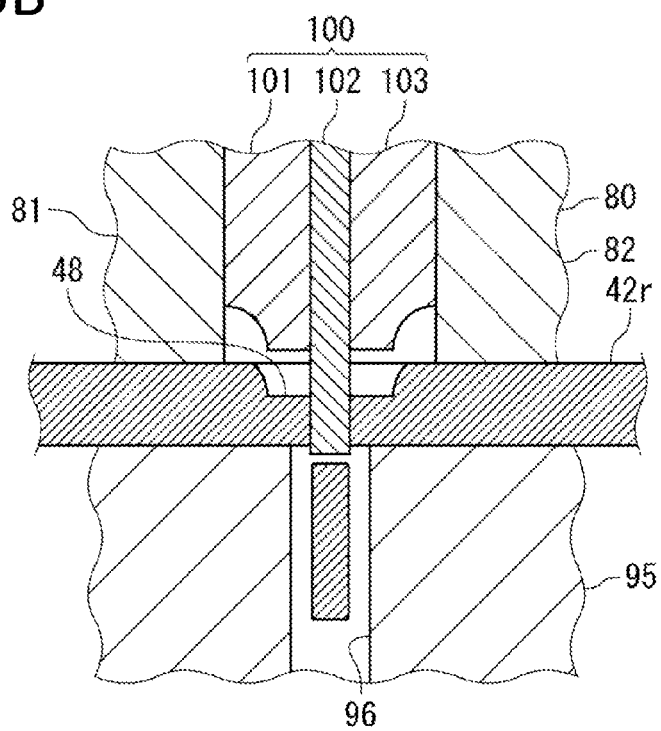

As shown in FIGS. 15A and 15B, the upper die 100 includes three parts, i.e., in a sequence from the inner side, an inner cylinder part 101, an intermediate cylinder part 102, and an outer cylinder part 103. The intermediate cylinder part 102 is capable of independently moving up and down relative to the inner cylinder part 101 and the outer cylinder part 103.

In the step of thinning, as shown in FIG. 15A, the inner cylinder part 101, the intermediate cylinder part 102, and the outer cylinder part 103 synchronously act on the armature material 42r to form the thin portion 48.

In the step of punching, after the inner cylinder part 101, the intermediate cylinder part 102, and the outer cylinder part 103 are raised away from the armature material 42r, as shown in FIG. 15B, the intermediate cylinder part 102 is lowered to perform a punching operation. That is, the intermediate cylinder part 102 functions as a punching die.

This variation of the third embodiment, in which the upper die 100 is divided into the inner cylinder part 101, the intermediate cylinder part 102, and the outer cylinder part 103, and in which the intermediate cylinder part 102 functions as a punching die, serves the same effects as the third embodiment, and also eliminates the need for providing a separate punching die. Moreover, compared to the third embodiment in which the pressing die 90 must be removed from the portion being processed, the variation allows for quick transition from the step of thinning to the step of punching. Thus, this variation can reduce production costs through shortening processing time.

Fourth Embodiment

The essence of a fourth embodiment is that, after thinning a region of an armature material 42r where a groove is to be formed and its peripheral edge region, a punching die is used to form the groove in the same manner as the third embodiment. Hereinafter, the fourth embodiment is described with reference to FIGS. 16 to 18. The same component portions as the first and third embodiments are identified by the same reference numerals, and will not be further described.

Figure 16A:
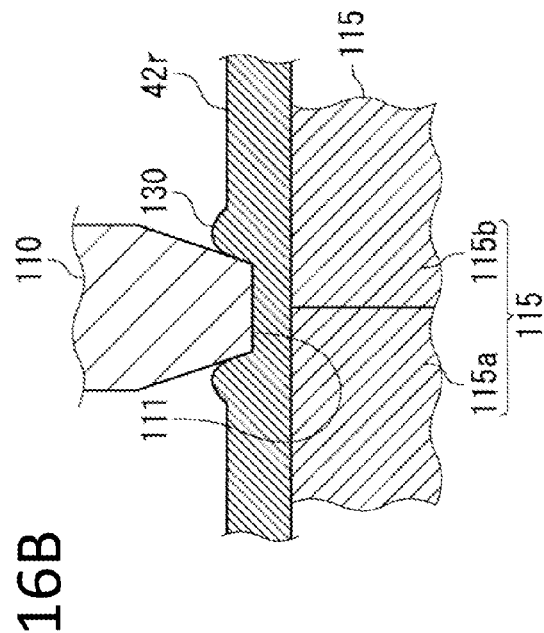
FIGS. 16A to 16D illustrate a procedure for producing an armature in accordance with a fourth embodiment.
Figure 16B:
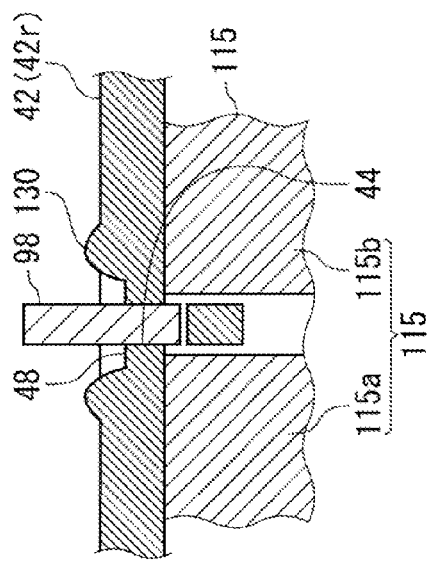
Figure 16C:
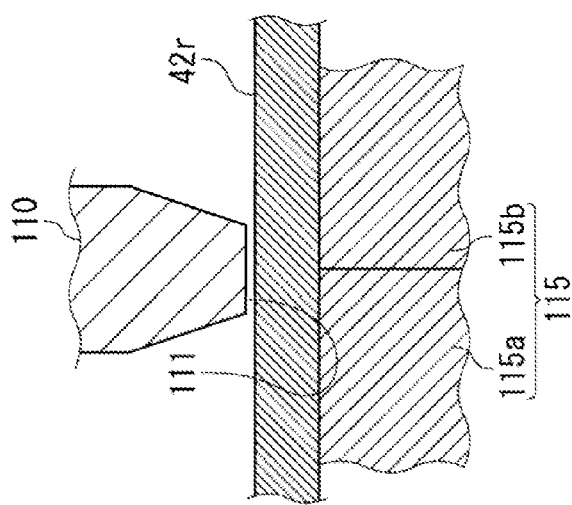
Figure 16D:
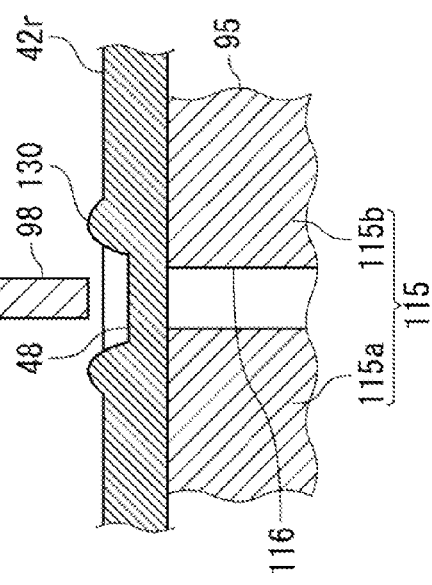

The fourth embodiment involves the steps of thinning the armature material 42r (FIGS. 16A and 16B), and punching the thin portion (FIGS. 16C and 16D).

The step of thinning is performed with a pressing die 110, and a lower die 115.

The pressing die 110 has a hollow cylindrical shape, and is provided with a pressing portion 111 at one end portion of the pressing die 110 in the axial direction. The pressing portion 111 may be shaped to include a flat surface or shaped to include a top portion at the center of the radial direction.

The lower die 115 is divided in the radial direction into an inner die 115a and an outer die 115b that are located on the inner and outer sides, respectively, of the location of the division. While the inner die 115a and the outer die 115b are in contact with each other in the thinning step, these dies are separated from each other to form a space 116 between them in the punching step.

The pressing die 110 and the lower die 115 are relatively positioned such that the center of the width of the pressing portion 111 is aligned with the center of the width of the space 116.

In the fourth embodiment, the pressing die 110 is lowered against the armature material 42r to locally thin the armature material 42r supported by the lower die 115 (FIGS. 16A and 16B). While a portion in the armature material 42r which portion faces the pressing portion 111 is thinned, the peripheral edge of a portion of the armature material 42r which portion faces the pressing die 110 is deformed by plastic flow to form a ridge 130.

After the thinning operation is performed as required, the pressing die 110 is removed and the inner die 115a and the outer die 115b of the lower die 115 are separated away from each other to form the space 116. Then, after a punching die 98 is positioned opposite to the thin portion 48 of the armature material 42r, the punching die 98 is lowered to form a groove 44 (FIGS. 16C and 16D). The resulting armature 42 is provided with a thin portion 48 around the groove 44 that is formed in the thinning step. The thin portion 48 has a thickness that continuously increases in both directions along the width direction.

The ridge 130 formed in the thinning step is removed, for example by cutting, and flattened. Though the removal of the ridge 130 is conducted after the punching step, it may be conducted before the punching step. The removal of the ridge 130 may be conducted by a machining process such as polishing and press working other than cutting.

In the fourth embodiment, a region where the groove 44 is to be formed is thinned to decrease resisting forces which occur in a punching operation, thereby improving workability of the material in forming the narrowed groove 44 as the third embodiment.

Also, in the fourth embodiment, as the step of punching is a final process step, the groove 44 is formed with high dimensional accuracy, without further processing.

In the fourth embodiment, the thin portion 48 is formed to have a flat bottom as the third embodiment. However, this is merely a preferred embodiment, and the bottom part of the thin portion 48 may have a thickness that continuously changes as the peripheral part thereof. Considering that the thin portion 48 is made to achieve high workability, a flat bottom as shown in the drawings is preferable. The thin portion 48 has a larger surface area than the area of the opening of the groove 44.

Figure 17A:
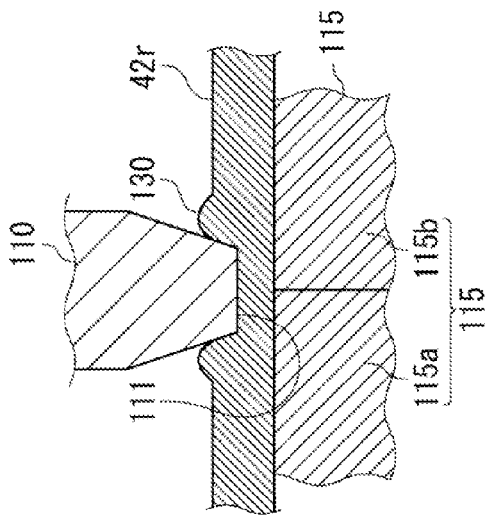
FIGS. 17A to 17D illustrate a procedure for producing an armature in accordance with the fourth embodiment.
Figure 17B:
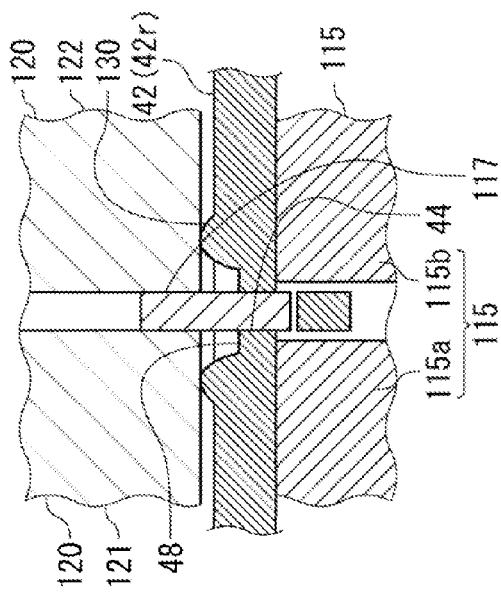
Figure 17C:
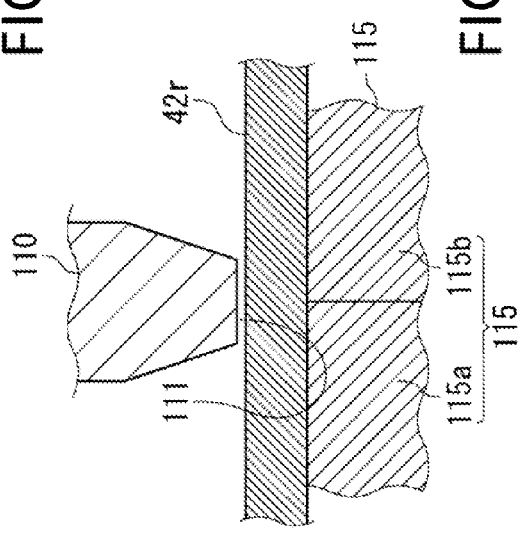
Figure 17D:
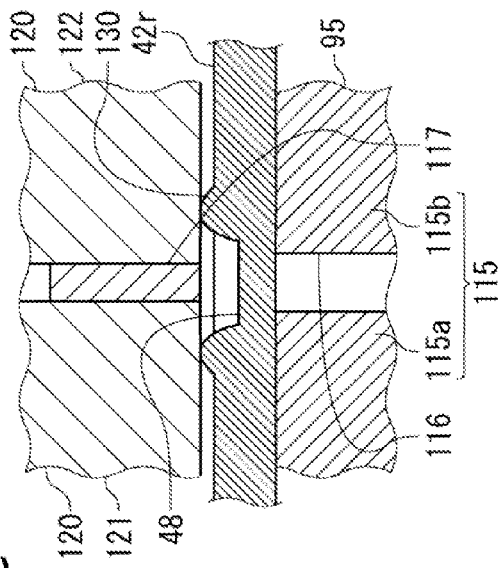
Figure 18A:
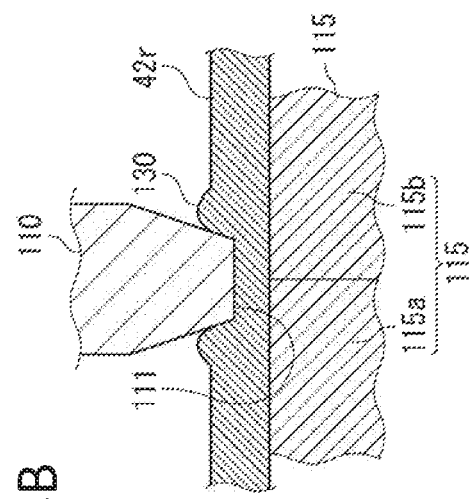
FIGS. 18A to 18D illustrate a procedure for producing an armature in accordance with the fourth embodiment.
Figure 18B:
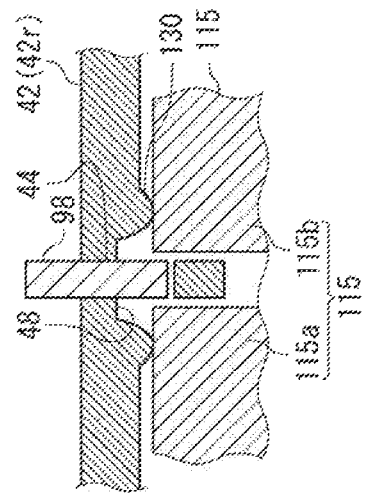
Figure 18C:
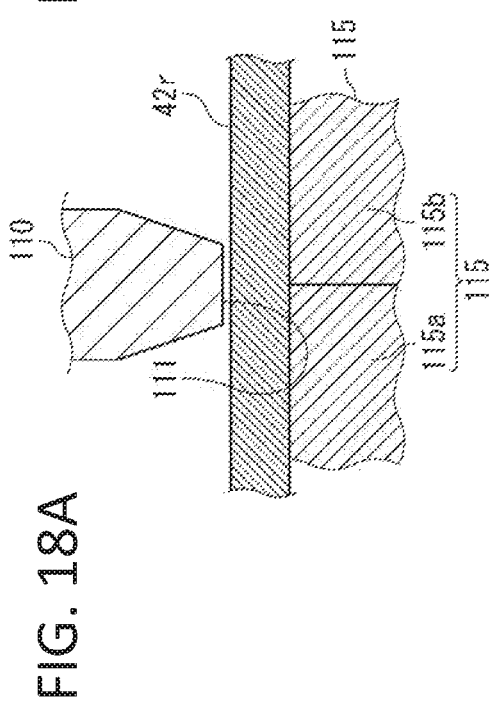
Figure 18D:
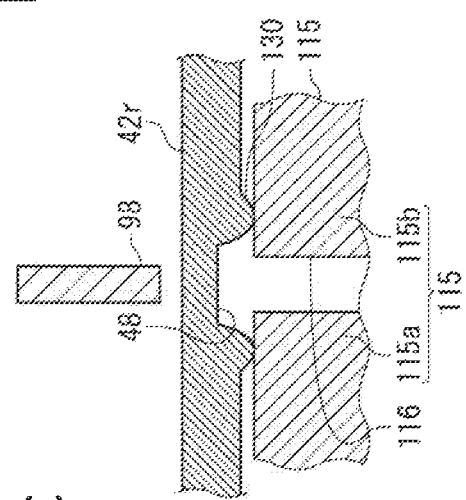
Figure 19:
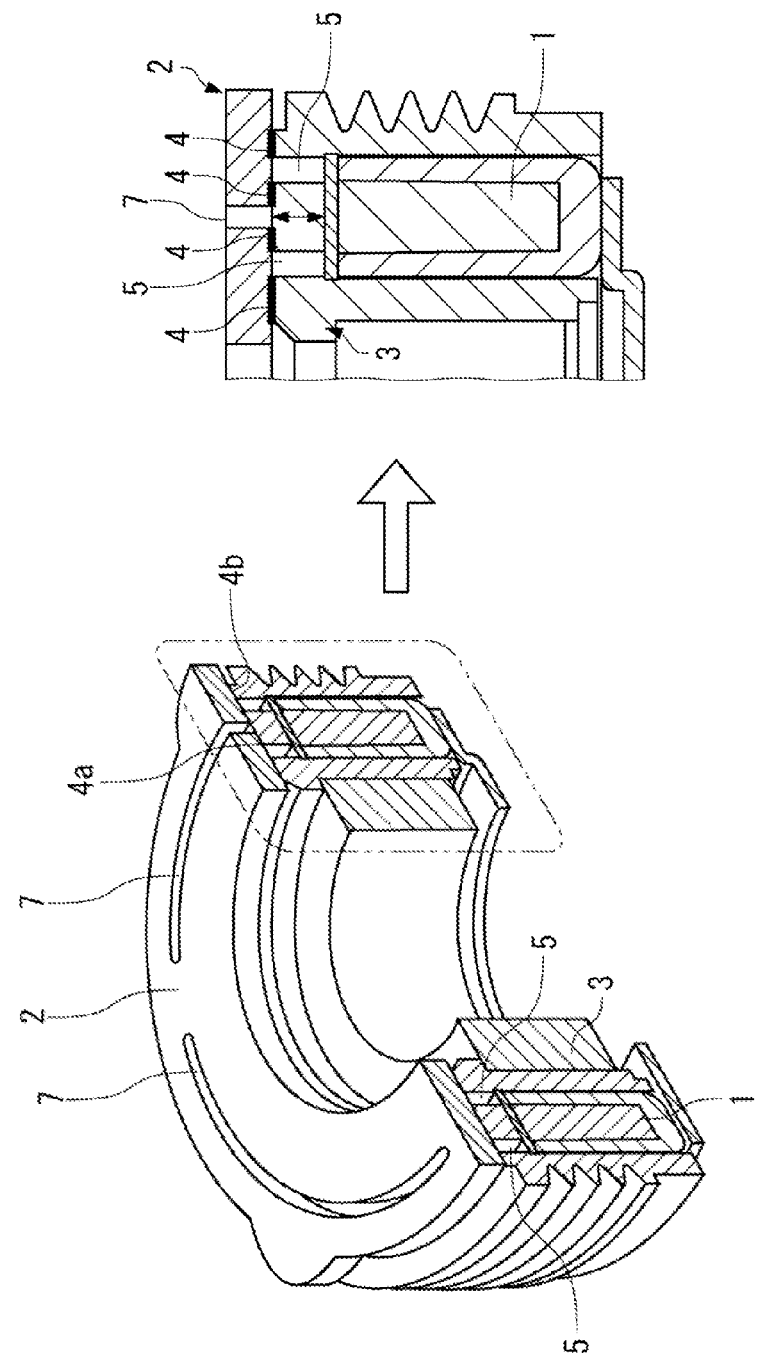
FIG. 19 illustrates a partial cross-sectional perspective view of an electromagnetic clutch of the prior art, and an enlarged sectional view of portions of an armature and a rotor of the prior art that are in tight contact with each other by pressure.
Figure 20A:
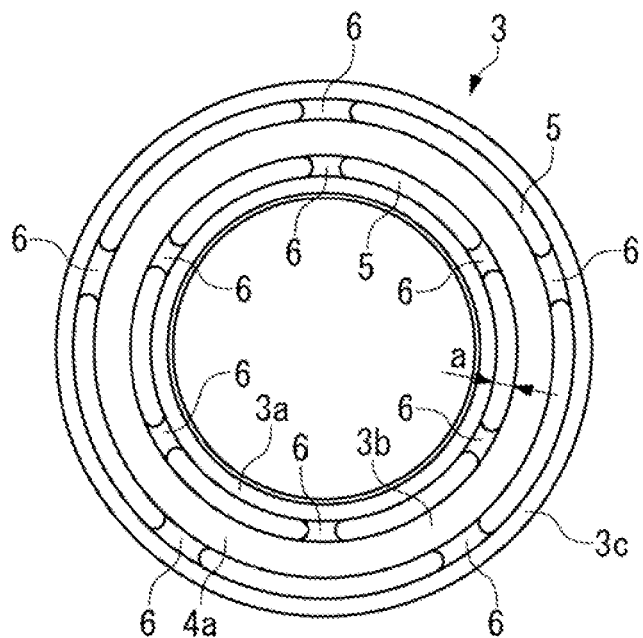
FIG. 20A is a plan view of the rotor of the prior art.
Figure 20B:
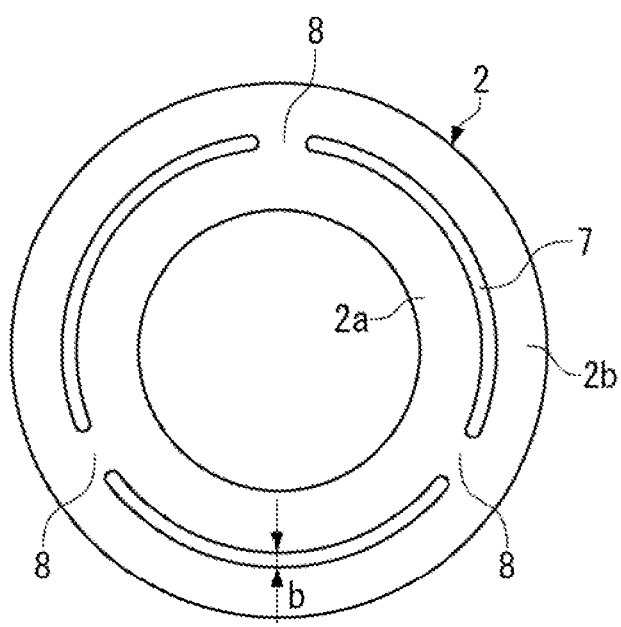
FIG. 20B is a plan view of the armature of the prior art.

In the above described punching step, as shown FIGS. 17C and 17D, a holding die 120 as well as the punching die 117 may be used. The holding die 120 includes a cylindrically shaped inner cylinder part 121 and a hollow circular cylindrically shaped outer cylinder part 122, and the inner cylinder part 121 is concentrically disposed within the outer cylinder part 122. The punching die 117 is disposed between the inner cylinder part 121 and the outer cylinder part 122 such that the punching die is slidable relative to the inner and outer cylinder parts 121, 122 in the axial direction. That is, the punching die 117 and the holding die 120 can be raised or lowered independently. The punching operation is performed by positioning the punching die 117 opposite to the thin portion 48 of the armature material 42 and then lowering the punching die while holding the armature material 42r with the holding die 120, whereby the accuracy of the punching operation can be improved.

Alternatively, as shown in FIG. 18, it is also possible to perform the punching step (FIGS. 18C, 18D) after performing the thinning step (FIGS. 18A, 18B) and then positioning the armature material 42r such that the ridge 130 of the armature material 42r faces to the lower die 115. Though the ridge 130 of the armature material 42r is removed after the punching step, it may be removed before the punching step. In this case, the holding die 120 as well as the punching die 117 may, of course, be used.

In the example as explained above, the lower die 115 with a divided structure is used. However, for example, a lower die with a one-piece structure shown in FIGS. 9A and 9B may be used. In this case, the lower die with a one-piece structure is removed after the thinning step and before the punching step, and then another lower die with a space into which the punching die 98 can be inserted is disposed so that the punching step can be performed.

Though, in the above described first to fourth embodiments, the present invention is described in the context of the structure of the scroll compressor 10, the present invention is not limited to the above configurations other than those related to the essential feature of the present invention. The same applies to the electromagnetic clutch M.

Other than these, the configurations cited in the above described embodiments can be selected or omitted, or can be changed to the other configurations as appropriate, without departing from the principles of the present invention. For example, though the pressing die 60 is formed to have a one-piece structure, it may have a circumferentially divided structure.

Also, it is expected that the bridges 50 become narrow after the narrowing process as a result of plastic flow that occurs in the pressed portion 47 around the groove 44. Thus, a material for the armature 42 before the narrowing process preferably has bridges 50 with a size that is wider than a designed value.

REFERENCE SIGNS LIST

10 scroll compressor
41 electromagnetic coil
42 armature (armature material)
42a inner ring
42b outer ring
42c depression
42r armature material
43 rotor
43a inner ring
43b intermediate ring
43c outer ring
44, 45A groove
46 rotor contact surface
46a rotor contact surface
46b armature contact surface
47 pressed portion
48 thin portion
60, 90, 110 pressing die
61, 91, 111 pressing portion
63 deformation restricting member
65 lower die
66, 111 pressing portion
70, 95, 115 lower die
70a, 115a inner die
70b, 115a outer die
70c deformation restricting member
71 supporting surface
72 depression
80, 120 holding die 81, 121 inner cylinder part
82, 122 outer cylinder part
83 pressing surface
96 slit
98, 117 punching die
116 space
130 ridge
M electromagnetic clutch

The invention claimed is:

1. An electromagnetic clutch comprising:
an armature having a rotor contact surface that is segmented in the radial direction by an annular groove to form a plurality of rings, the groove being formed concentrically with the armature for obstructing magnetic flux; and
a rotor having a contact surface, wherein the armature is attracted toward the contact surface of the rotor by magnetic force caused by an electromagnetic coil so as to couple the armature with the rotor for transmitting power,
wherein the groove formed on the rotor contact surface of the armature is defined by a portion of the armature surrounding the groove, which portion is plastic flowed toward the center of the width of the groove.

2. The electromagnetic clutch according to claim 1, wherein the portion of the armature that is plastic flowed has a thinner thickness than a surrounding portion adjacent to the portion of the armature that is plastic flowed.

3. A method for producing an armature for an electromagnetic clutch, wherein the electromagnetic clutch comprises:
the armature having a rotor contact surface that is segmented in the radial direction by an annular groove to form a plurality of rings, the groove being formed concentrically with the armature for obstructing magnetic flux; and
a rotor having a contact surface, wherein the armature is attracted toward the contact surface of the rotor by magnetic force caused by an electromagnetic coil so as to couple the armature with the rotor for transmitting power, and
wherein the armature is formed by the steps of:
thinning an armature material locally by applying pressure on a pressed portion where the groove is to be formed, thereby forming a thin portion in the armature material; and
punching the thin portion with a punching die to form the groove.

4. The method for producing an armature according to claim 3, wherein, in the step of thinning, the pressure is applied by pressing a pressing die on the armature material supported by a supporting surface of a lower die, the pressing die being provided with a pressing portion corresponding to the pressed portion, and
wherein the lower die is provided with a slit for receiving a portion of the armature material which is plastic flowed when the pressing die is pressed.

5. The method for producing an armature according to claim 4, wherein the pressing die has a divided structure in which a part of the pressing die serves as the punching die.

6. The method for producing an armature according to claim 3, wherein the pressing die has a divided structure in which a part of the pressing die serves as the punching die.

7. A method for producing an armature for an electromagnetic clutch, wherein the electromagnetic clutch comprises:
the armature having a rotor contact surface that is segmented in the radial direction by an annular groove to form a plurality of rings, the groove being formed concentrically with the armature for obstructing magnetic flux; and
a rotor having a contact surface, wherein the armature is attracted toward the contact surface of the rotor by magnetic force caused by an electromagnetic coil so as to couple the armature with the rotor for transmitting power, and
wherein the armature is formed by the steps of:
preparing an armature material with the groove formed on the armature material, the groove having a width of w1; and
narrowing the width of the groove from w1 to w2 by applying pressure on a pressed portion in a peripheral edge region of the groove of the armature material to cause plastic flow in a horizontal direction along the armature material.

8. The method for producing an armature according to claim 7, wherein, in the step of narrowing the width of the groove, the pressure is applied by pressing a pressing die on the armature supported by a supporting surface of a lower die, the pressing die being provided with a pressing portion corresponding to the pressed portion.

9. The method for producing an armature according to claim 8, wherein the supporting surface of the lower die is provided with a depression at a portion corresponding to the pressed portion of the armature.

10. The method for producing an armature according to claim 9, wherein the lower die is divided at the bottom of the depression into an inner die and an outer die that are located on the inner side and outer side, respectively, of the location of the division.

11. The method for producing an armature according to claim 8, wherein, in the step of narrowing the width of the groove, the pressure is applied by pressing the pressing die on the pressed portion while holding the armature between a holding die provided around the pressing die and the lower die.

12. The method for producing an armature according to claim 8, wherein, excluding a portion corresponding to the pressed portion, one or both of the supporting surface of the lower die and an armature contact surface of the holding die are subjected to friction intensifying treatment.

13. The method for producing an armature according to claim 8, wherein one or both of the pressing portion of the pressing die and a portion of the lower die corresponding to the pressed portion are subjected to friction reducing treatment.

14. The method for producing an armature according to claim 8, wherein the pressing portion of the pressing die is formed to have a curved shape or a flat shape at a portion for contacting the armature.

15. The method for producing an armature according to claim 7, wherein the supporting surface of the lower die, which supporting surface includes a portion corresponding to the pressed portion of the armature, is formed to be flat.

16. The method for producing an armature according to claim 7, wherein, in the step of narrowing the width of the groove, a deformation restricting member is inserted into the groove of the armature for restricting the inward horizontal deformation of the pressed portion.

17. The method for producing an armature according to claim 7, wherein, subsequent to the step of narrowing the width of the groove, one or both of a surface including the pressed portion and a back surface opposite the surface including the pressed portion are processed to be flat.

* * * * *